(12) United States Patent
Parker

(10) Patent No.: US 11,747,777 B2
(45) Date of Patent: *Sep. 5, 2023

(54) SERVICE PANEL WITH MICROPROCESSOR

(71) Applicant: WCM Industries, Inc., Colorado Springs, CO (US)

(72) Inventor: Phil A. Parker, Naples, TX (US)

(73) Assignee: WCM Industries, Inc, Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,127

(22) Filed: Jan. 27, 2022

(65) Prior Publication Data
US 2022/0146998 A1 May 12, 2022

Related U.S. Application Data

(63) Continuation of application No. 16/696,641, filed on Nov. 26, 2019, which is a continuation of application
(Continued)

(51) Int. Cl.
*G05B 15/02* (2006.01)
*G01M 3/28* (2006.01)
*E03B 7/07* (2006.01)

(52) U.S. Cl.
CPC ........... *G05B 15/02* (2013.01); *G01M 3/2815* (2013.01); *E03B 7/071* (2013.01);
(Continued)

(58) Field of Classification Search
None
See application file for complete search history.

(56) References Cited

U.S. PATENT DOCUMENTS 1,115,092 A 10/1914 Neahr
1,145,764 A 7/1915 Fuller
(Continued)

FOREIGN PATENT DOCUMENTS

GB 2359891 9/2001

OTHER PUBLICATIONS

Flamefast Product Data Sheet, Flamefast Gasguard 1 Automatic Gas Proving System, Jun. 2003, 2 pages.
(Continued)

*Primary Examiner* — Jared Fureman
*Assistant Examiner* — Aqeel H Bukhari

(57) ABSTRACT

A service panel for controlling at least one utility actuator to control the availability of a utility comprises a covered enclosure having an exterior region and an interior region, at least one readily accessible utility control providing ON and OFF request signals and a limited access control in the exterior region providing a temporary activate signal. The service panel has a controller and data storage programmed with code and data and control circuitry providing an "ON" control signal to the at least one utility actuator to switch the at least one utility actuator to the "ON" state, and the control circuitry providing an "OFF" control signal to the at least one utility actuator to switch the at least one utility actuator to an OFF state, the control circuitry further providing a re-key signal to the at least one actuator in response to activation of a switch.

20 Claims, 34 Drawing Sheets

Related U.S. Application Data

No. 16/200,207, filed on Nov. 26, 2018, now Pat. No. 10,509,380, which is a continuation of application No. 15/923,922, filed on Mar. 16, 2018, now Pat. No. 10,168,680, which is a continuation of application No. 15/627,421, filed on Jun. 19, 2017, now Pat. No. 10,162,321, which is a continuation of application No. 13/975,156, filed on Aug. 23, 2013, now Pat. No. 9,683,911, which is a continuation-in-part of application No. 13/004,671, filed on Jan. 11, 2011, now Pat. No. 8,543,225.

(60) Provisional application No. 61/295,948, filed on Jan. 18, 2010.

(52) U.S. Cl.
CPC .............. *G05B 2219/24003* (2013.01); *G05B 2219/24146* (2013.01); *G05B 2219/2642* (2013.01); *Y02A 20/15* (2018.01)

(56) References Cited

U.S. PATENT DOCUMENTS

| | | |
|---|---|---|
| 2,856,474 A | 10/1958 | Norris |
| 3,372,251 A | 3/1968 | Bowman et al. |
| 3,417,212 A | 12/1968 | Driscoll |
| 3,543,096 A | 11/1970 | Bedford |
| 4,262,687 A | 4/1981 | Kobayashi |
| 4,263,928 A | 4/1981 | Kobayashi et al. |
| 4,519,657 A | 5/1985 | Jensen |
| 4,841,287 A | 6/1989 | Flig et al. |
| 4,957,273 A | 9/1990 | Sears |
| 5,126,934 A | 6/1992 | MacFadyen |
| 5,267,587 A | 12/1993 | Brown |
| 5,274,527 A | 12/1993 | Retzlaff |
| 5,331,619 A | 7/1994 | Barnum et al. |
| 5,440,477 A | 8/1995 | Rohrberg et al. |
| 5,572,438 A | 11/1996 | Ehlers et al. |
| 5,861,683 A | 1/1999 | Engel et al. |
| 6,237,618 B1 | 5/2001 | Kushner |
| 6,267,587 B1 | 7/2001 | Bishop et al. |
| 6,757,589 B1 | 6/2004 | Parker et al. |
| 6,775,593 B1 | 8/2004 | Parker et al. |
| 6,990,393 B2 | 1/2006 | Parker |
| 8,543,225 B2 | 9/2013 | Parker |
| 9,683,911 B2 | 6/2017 | Parker |
| 10,162,321 B1 | 12/2018 | Parker |
| 10,168,680 B1 | 1/2019 | Parker |
| 10,509,380 B1 | 12/2019 | Parker |
| 2002/0011949 A1 | 1/2002 | Rudow et al. |
| 2005/0033479 A1* | 2/2005 | Parker ................ F16K 37/0075 700/282 |
| 2006/0020469 A1 | 1/2006 | Rast |
| 2007/0053123 A1* | 3/2007 | Filippenko ................ H02H 3/04 361/62 |
| 2007/0220907 A1 | 9/2007 | Ehlers |
| 2008/0091309 A1 | 4/2008 | Walker |
| 2008/0115147 A1 | 5/2008 | Ding |
| 2010/0164296 A1 | 7/2010 | Kurs |
| 2010/0179670 A1* | 7/2010 | Forbes, Jr. ............. G01D 4/004 709/206 |
| 2011/0004357 A1 | 1/2011 | Mathiowetz |
| 2011/0093123 A1 | 4/2011 | Alexanian |
| 2011/0178609 A1 | 7/2011 | Parker |
| 2015/0057765 A1 | 2/2015 | Parker |

OTHER PUBLICATIONS

Medem UK Products Brochure, Gas Pressure Proving System GPPS-plus, 9 pages, Jan. 11, 2002.

T.C.W. Services (Controls), Ltd, Firewatch Brochure, Gas Supply Isolating and Pressure Drop Testing System, 34 pages, Jun. 8, 2001.

\* cited by examiner

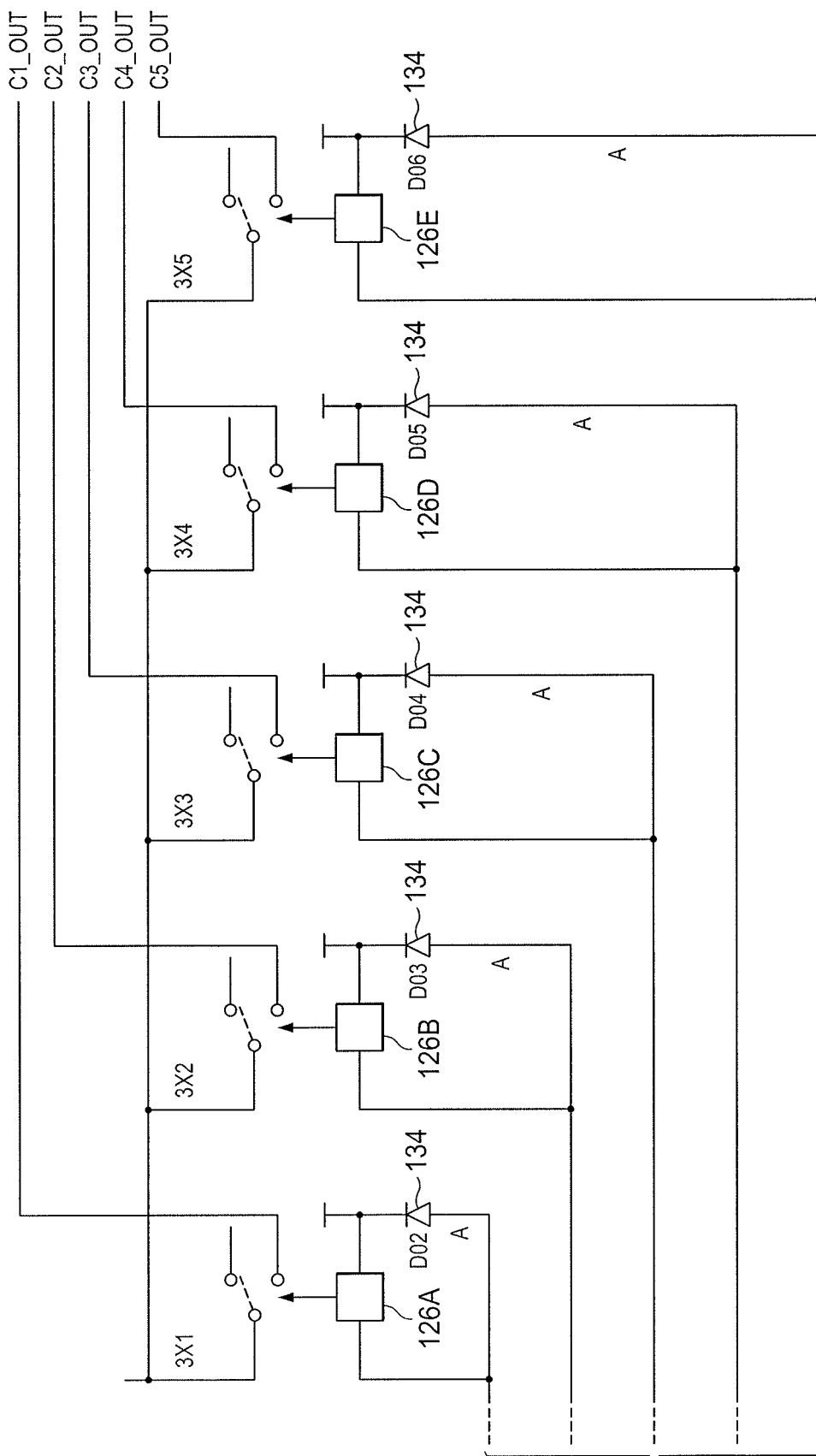

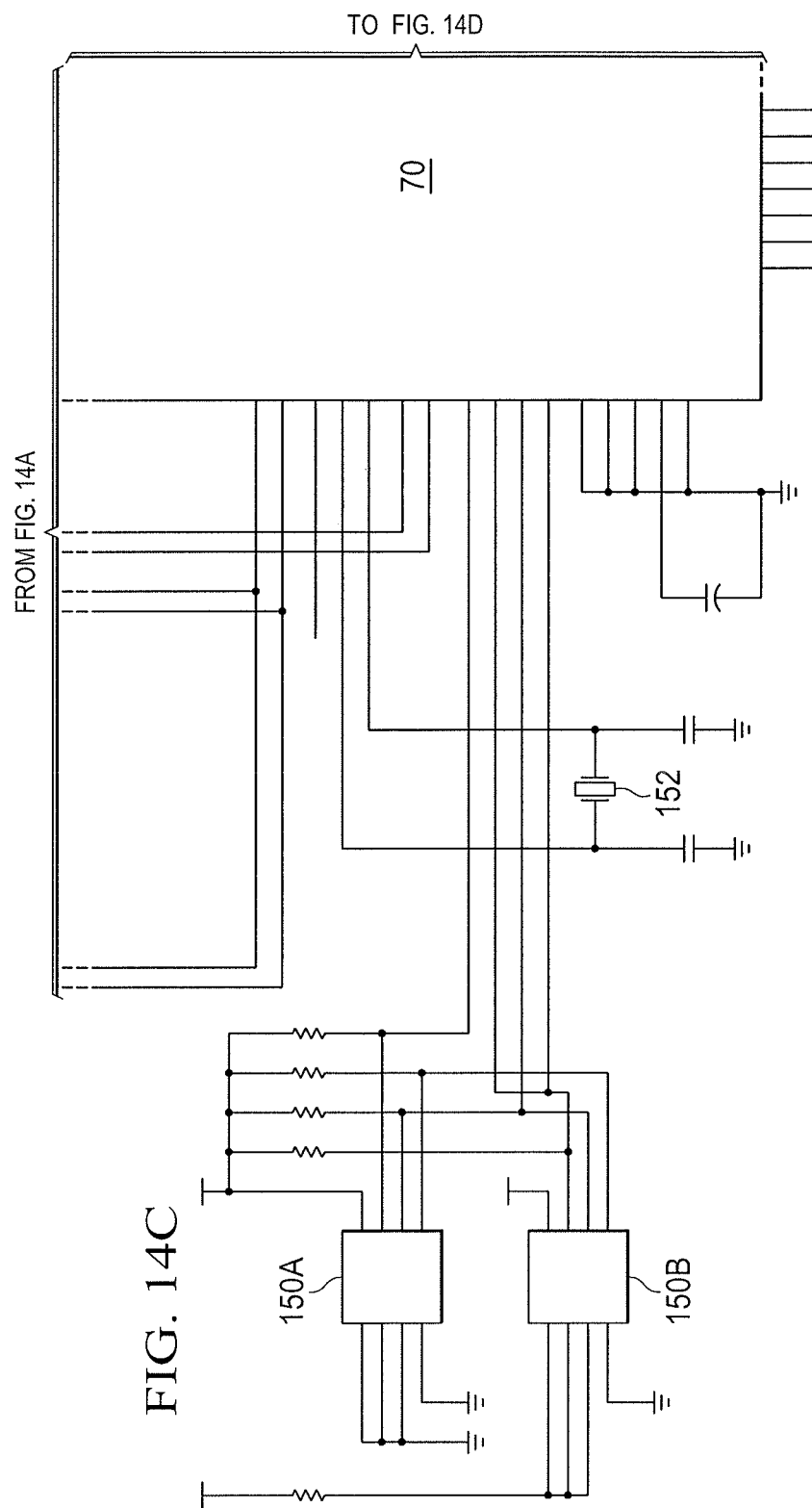

SERVICE PANEL WITH MICROPROCESSOR

CROSS-REFERENCE TO RELATED APPLICATIONS

This application is a continuation of U.S. patent application Ser. No. 16/696,641, filed Nov. 26, 2019, which is a continuation of U.S. patent application Ser. No. 16/200,207, filed Nov. 26, 2018, now U.S. Pat. No. 10,509,380, issued Dec. 17, 2019, which is a continuation of U.S. patent application Ser. No. 15/923,922, filed Mar. 16, 2018, now U.S. Pat. No. 10,168,680, which is a continuation of U.S. patent application Ser. No. 15/627,421, filed Jun. 19, 2017, now U.S. Pat. No. 10,162,321, which is a continuation of U.S. patent application Ser. No. 13/975,156, filed Aug. 23, 2013, now U.S. Pat. No. 9,683,911, issued Jun. 20, 2017, which is a continuation-in-part of U.S. patent application Ser. No. 13/004,671, filed Jan. 11, 2011, now U.S. Pat. No. 8,543,225, issued Sep. 24, 2013, which claims the benefit of U.S. Provisional Patent Application Ser. No. 61/295,948, filed on Jan. 18, 2010, all of which are incorporated herein by reference herein in their entireties. To the extent appropriate, a claim of priority is made to each of the above disclosed applications.

BACKGROUND

This invention relates to controlling utility services within buildings and more particularly to the control of such utility services. As examples, control of utility services within buildings is disclosed in U.S. Pat. No. 5,267,587 granted to Geoffrey P. Brown on Dec. 7, 1993 and U.S. Pat. No. 5,331,619 granted to Thomas G. Barnum, et al., on Jul. 19, 1994. Plumbing and electrical service within commercial and/or public building structures is typically required to be provided with a means of control so that individual areas receiving these services can be isolated from other areas of the building for the purposes of repair.

A common method for this isolation of electrical services is a wall switch or an electrical breaker located within a service panel that is located at some remote location within the building. These switches and breakers typically control lights, electrical outlets and various pieces of equipment, whereas the common method for the isolation of plumbing services is a cut-off valve that may be located above ceiling panels or concealed within a wall that requires access through a service panel. If the service is natural gas, then the cut-off valve may well be located on the roof. Cut-off valves also control water to plumbing fixtures and equipment or gas to appliances.

In the construction of a building containing science laboratory rooms such as a school facility, dependable and efficient control of these services is important. Such control typically utilizes electrically activated contacts, relays, and solenoid valves. These various electrical control apparatuses are typically controlled or activated by simply turning ON or OFF an electrical switch to energize or de-energize the apparatus. These switches may also be located on a wall or may be concealed, such as for example, within a cabinet or in an instructor's desk, etc.

One method of controlling these services regulates accessibility to the services, such that a classroom instructor can determine those times when the students in the classroom need the various services. When a service is needed, the switch can be turned to the ON position and access to the service is granted. On the other hand, when a service is not needed, the switch remains in the OFF position and access is denied. This control method helps to prevent accidental or unauthorized use of the service. However, there are several disadvantages associated with this type of control means. For instance, for maintenance purposes, if the cut-off valve and the solenoid controlling the valve to the plumbing service is positioned in a concealed ceiling space, then it may become necessary to first determine the location of the valve and solenoid, and then find a ladder or other means to gain access to the valve. If an emergency arises, it may be virtually impossible to close the valve within a short period of time. Also, if these valves are located upon the roof, it will be necessary to first gain access to the roof before any maintenance can be performed.

Also, if the service and solenoid valves are remotely located away from the controlling switch, it is necessary to install wiring from the control switch to the valve, and therefore, the exact locations of the valves and the voltage necessary to activate the solenoid valves must be known and available.

In addition, as is often the case in the installation of natural gas services, it may be required that the concealed gas piping and valve apparatus be within a secondary containment enclosure. In such a case, when the gas service is controlled by an electrical solenoid, it is essential that not only the pipe and valve be sealed within the enclosure, but because of the possibility of shorts and/or sparks, etc., it is also necessary that the electrical conduit and wiring connections be likewise sealed. Therefore, it is not only required that the conduit connectors be airtight, but also that the wiring within the conduits be sealed.

In the case of remote control of the electrical service to the classroom, typically a remote set of contacts or a relay is utilized to control the electrical outlets. This relay may be located within an access panel or box and located within the ceiling space. The relay may then be activated by an electrical switch located within the room.

Since an intent of this invention is the control and ability to restrict the various services to the classroom, it becomes necessary to provide a method to deny or regulate access to the controlling switch. In other words, if the instructor does not choose to permit the use of a service such as the cold water outlets in the room, then the electrical control switch should be left in the OFF position. If it is desired that the activation of this switch be strictly controlled, then this switch will likely be located within a locked and/or concealed containment area such as the instructor's desk.

However, with these described restrictions to access, if an emergency arises it would become necessary for the instructor to first unlock the containment area before the switch could be turned OFF and the service deactivated. Also, if the instructor were to be called away from the classroom momentarily, then there would be no means of quickly deactivating the service in the event of an emergency.

Not only would this configuration create a potential hazard, but also it restricts future repositioning and arrangement of the classroom. For instance, if the instructor's desk has electrical switches that are connected with wiring through electrical conduits, repositioning the desk would not be a trivial task.

To help prevent such emergency situations electrical panic-type push buttons are often positioned near the exit to the classroom, and are typically connected to a building fire alarm system. Though these panic buttons may deactivate the services during emergency situations, it is also necessary to provide wiring so that the remotely-located solenoid valves and electrical relays can be disengaged.

A situation where the instructor fails to deactivate a service at the end of the classroom day should also be considered. In such an event, the service would remain active through non-use periods. If any emergency arose during these times, then the possibility of a catastrophe is increased.

More specifically, if the service was not deactivated, and near the end of the school day a student inadvertently leaves a cold water faucet opened at a sink, that has a clogged drain that prevents the drainage of the water from the sink, by the beginning of the next school day a tremendous amount of water damage could occur within the classroom. Further, if the event occurred prior to an extended weekend or holiday, then this damage could likely extend to the entire school.

An even more dangerous situation would exist if a gas valve was left open. The results of such an event could be catastrophic. Clearly, a better method to control these services to school science classrooms needs to be found.

Means to remotely control and activate the various "HVAC" systems located within the building are typically available. This method is commonly referred to as "EMS" or energy management system. Though this "EMS" does have the capability to regulate time intervals when services can be activated, there may not exist a common link between the "EMS" and the activating switches for science classroom services.

Since different schools or classrooms may have different needs, it would also be advantageous to allow for different configuration of the utility controller unit as well as for easily adding upgrades to the system after installation. Similarly, in certain instances, it may also be advantageous for cost savings and or simplicity of operation to control two different but similar utilities by a single control circuit. For example, domestic hot and cold water could be turned on by a single circuit, and thereby allow control of another utility.

Further, the ability to activate and deactivate various circuits from any position in a classroom may also be important. Therefore, the ability to upgrade the system to generate control signals by remote may also be important.

Continuous monitoring of the system at a high level may also be a requirement. However, every instance that at first appears to be an emergency situation may not actually be an emergency. Therefore, the ability for the classroom instructor to neutralize a situation that is not actually an emergency without alerting high level monitoring could be a great benefit.

SUMMARY OF THE INVENTION

The present invention comprises a control device that permits a single operator to turn ON circuits that control these utilities or equipment while permitting any user to turn OFF the same circuit. This method of operation will make the work environment safe in which it functions. In addition, the control device has the capability to be integrated with various types of building automation, operating and monitoring systems so that strategic electronic inputs from those systems will effect operation and some control of the device.

Specifically, the receipt of a fire alarm signal can be programmed to place the system into an Alarm Mode where all circuits will turn OFF. Likewise, a signal from a building automation system can enable and disable the operation of the device during specific time periods.

The invention also uses a microprocessor or programmable logic controller. This permits a significantly expansion of capabilities over other devices. Specific operating capabilities can be field configured so that the outcome of operation can be altered from those established at the time of manufacturing. Also, operational requirements or restrictions of a circuit can be altered for specific needs.

Further, the control device of this invention advantageously, in normal or typical operating modes, restricts the operation ON condition of a circuit by requiring the turning "ON" of a control switch and then keying of a service switch, whereas a circuit intended to operate an exhaust or purge fan may be programmed to not require a service switch keying to turn ON each time a user determines that the fan should operate. Also, in the case of an emergency or when a panic button has been pressed, the control device for this fan circuit may be programmed to be operated while other circuits are in an "OFF" condition. A touchscreen may be used as a switch or interface to operate the microprocessor or programmable logic controller or to control other relays, sensor, devices or the like.

A radio frequency "RF" hand-held remote control is also provided to permit the user to activate and deactivate the various circuits from any position within the room, and for situations where a building automation system is not present, an integral master timing programming capability is available to prevent the operation of utilities and equipment during non-intended periods. Likewise, having shorted periods of operational periods whereby circuits would turn OFF after the expiration of determined time has lapsed is also possible with the invention. Further, in cases where the device's operation is monitored by other systems, a panic signal transmitted by the device may be delayed for a brief period, according to the invention, in order for the operator to determine the significance of the emergency that prompted the panic and when advisable rectify the occurrence prior to the panic signal being transmitted.

The present invention further includes the capability of the device to monitor other safety equipment so as to make the operation of the control device safer. For instance, a fuel gas detection device incorporated into the operation of the invention could turn OFF a circuit that is utilized to control flow of fuel gas. Likewise, a circuit operating a purge fan could automatically turn ON when this detection device relays to the invention that raw gas has been detected.

An extended number of input and output circuits enhances the operation of this invention. In many instances, the control of more than three or four utilities or devices may be desired. Further, the ability to integrate or accept input from various other systems and devices is also possible. Control over secondary control devices such as an independent controller located within an adjoining preparation room or within a demonstration desk would make the use of a classroom or other operating environment safer. The use of a microprocessor in the present invention enables the introduction of these capabilities.

The service panel with utility controller according to this invention typically comprises an access service panel to contain the control components, solenoids, relays, switches, wiring, connectors and locks. In addition, in some embodiments the service panel may also control the cut-off valves, the various pipe fittings. That is, the service panel can control all of the major components needed to control and activate the various services that are used in a typical school classroom while ensuring the safety of the students in the classroom.

More specifically, the utility controller of this invention typically comprises an enclosure having an exterior region with certain indicators and switches or controls available to anyone, and interior region. Access to the interior region is limited such as, for example, by a cover with a keyed lock.

There is also included at least one utility actuator that can be switched between an "ON" state and an "OFF" state in response to a control signal. The availability of a utility is controlled by the actuator. Control circuitry typically carried on a printed circuit board is located within the interior region and is coupled to the actuator for providing the control signal. The printed circuit board generates the control signal in response to receiving either an ON or OFF request signal that results from activating a readily accessible ON/OFF utility switch.

Other objects and advantages are to provide a service panel that restricts the unauthorized use of the various services to the science classroom. The door-mounted indicators provide for ease in determining the services that are activated. Because a key is needed to activate but not deactivate the services, usage of the service panel is made simple. Restricted access to the interior compartment of the service panel may be further limited to authorized maintenance personnel. This feature prevents inadvertent injury to non-authorized persons. It further prevents potential damage to the interior components of the service panel. Also as mentioned above, according to some embodiments, the plumbing cut-off and solenoid valves may also be located within the panel compartment to simplify maintenance.

Since control and access to the panel is restricted, the service panel with the controller can be located in plain sight and near the exit to the classroom. Therefore, the panic button mounted upon the door of the service panel and available to everyone will deactivate the services in the event of an emergency. This panic button can also be connected to the building fire alarm system, thus notifying authorities in the event of an emergency. Further, after the pressing of the panic button, it is necessary to reset the utility controller prior to reactivation of the services. Therefore, since the reset switch is located within the locked interior region of the service panel, reactivation of the service during an emergency by unauthorized persons is avoided.

The utility controller of this invention also includes a means that may be set to regulate the time of day that the service panel can be activated and deactivated; therefore, the risk that a service is inadvertently left active can be avoided.

Typically, the utility controller is located within the service panel, which also houses the microprocessor and other electrical components. This unique design prevents potential water damage to the component due to leakage in water service piping.

Further, requirements that natural gas piping be within a secondary containment enclosure may also be achieved. For example and as mentioned above, according to one embodiment, although the utility controller has exposed electrical wiring that enters the box through non-sealed conduit, it also may include a gasketed door that, once closed and secured, seals it from the main service panel. The service panel having a gasketed door panel may then meet the required secondary containment enclosure.

The electrical relay for control of electrical outlets may be remotely located; however, the control switch and necessary wiring and other control components may still be centrally located with the switches for the other various services.

Also, because the service panel and utility controller contain pre-wired components with disconnect switches, there is ease in maintenance.

Accordingly, a service panel for controlling at least one utility actuator to control the availability of a utility comprises a covered enclosure having an exterior region and an interior region, at least one readily accessible utility control having an "ON" position and an "OFF" position for providing ON and OFF request signals and a limited access control in the exterior region providing a temporary activate signal. The service panel further comprises a controller and data storage programmed with code and data and control circuitry providing an "ON" control signal to the at least one utility actuator to switch the at least one utility actuator to the "ON" state, and the control circuitry providing an "OFF" control signal to the at least one utility actuator to switch the at least one utility actuator to an OFF state, the control circuitry further providing a re-key signal to the at least one actuator in response to activation of a switch. A readily accessible emergency shut-off control provides a shut-down signal to the control circuitry.

The service panel may further comprise a cover for the enclosure to limit access to the interior region with at least one of the limited access control, the utility control and the emergency shut-off control mounted on the cover of the enclosure. The service panel may have a touchscreen exposed to the exterior region, the touchscreen providing an interface to the controller. The controller may be one of a programmable logic controller and a microprocessor. In an embodiment, the control circuitry is configured to control the at least one utility actuator in response to an alarm signal, and the service panel further comprises a selectable switch configured to switch alarm signal inputs. The service panel may have a USB port connected to the control circuitry and configured to update the code and data from a device connected to the USB port. The control circuitry may be configured to provide the re-key signal on activation of a keyed switch. The service panel may have a relay configured to provide the re-key signal on receipt of an outside signal. The limited access control in the exterior region may provide a temporary activate signal, and switching the utility control to an OFF condition disables the utility control until again enabled by the temporary activate signal from the limited access control.

According to another embodiment, a service panel for controlling at least one utility actuator for switching between an "ON" state and an "OFF" state to control the availability of a utility comprises an enclosure having an exterior region and an interior region, a cover for the enclosure to limit access to the interior region, at least one readily accessible utility control having an "ON" position and an "OFF" position for providing ON and OFF request signals, a limited access control in the exterior region for providing a temporary activate signal, and a printed circuit board (PCB) located within the interior region of the enclosure. The PCB comprises a controller and data storage programmed with default code and data and further comprises control circuitry disposed on the PCB providing an "ON" control signal to the at least one utility actuator to switch the at least one utility actuator to the "ON", the control circuitry providing an "OFF" control signal to the at least one utility actuator to switch the at least one utility actuator to an OFF state, the control circuitry comprising connections for connecting with selected add-on modules, the control circuitry further providing a re-key signal to the at least one actuator. The service panel further comprises a readily accessible emergency shut-off control for providing a shut-down signal to the control circuitry, the shut-down signal continually disabling the utility actuator until the service panel receives a reset signal.

The service panel further comprises a touchscreen exposed to the exterior region, the touchscreen providing an interface to the controller. The controller and data storage comprises one of a programmable logic controller and a microprocessor. The control circuitry is configured to control the at least one utility actuator in response to an alarm signal, and the service panel further comprises a selectable switch configured to switch alarm signal inputs. A USB port is connected to the control circuitry, and the control circuitry is configured to update the code and data from a device connected to the USB port. The service panel further comprises a keyed switch, the control circuitry configured to provide the re-key signal on activation of the keyed switch.

According to another embodiment, a service panel for controlling at least one utility actuator for switching between an "ON" state and an "OFF" state to control the availability of a utility, comprises an enclosure having an exterior region and an interior region, a cover for the enclosure to limit access to the interior region, at least one readily accessible utility control having an "ON" position and an "OFF" position for providing ON and OFF request signals, a limited access control in the exterior region for providing a temporary activate signal and a printed circuit board (PCB) located within the interior region of the enclosure. The PCB comprises a controller and data storage programmed with default code and data, the default code and data responsive to reprogramming signals and control circuitry mounted on the PCB providing an "ON" control signal to the at least one utility actuator to switch the at least one utility actuator to the "ON" state, the "ON" control signal being provided only when both the "ON" request signal and the temporary activate signal are present, and the control circuitry for providing an "OFF" control signal to the at least one utility actuator to switch the at least one utility actuator to an OFF state, the control circuitry further comprising connections for connecting with selected add-on modules, the control circuitry further for providing a re-key signal to the at least one utility actuator. The service panel further comprises circuitry to receive the reprogramming signals and a readily accessible emergency shut-off control providing a shut-down signal to the control circuitry, the shut-down signal continually disabling the utility actuator until the service panel receives a reset signal.

In some embodiments, controller is one of a programmable logic controller and a microprocessor. The control circuitry may be configured to control the at least one utility actuator in response to an alarm signal, wherein the service panel further comprises a selectable switch configured to switch alarm signal inputs. The service panel may further comprise a USB port connected to the control circuitry, and the control circuitry is configured to update the default code and data from a device connected to the USB port. The service panel may further comprise a keyed switch and a relay configured to activate in response to an outside signal with the control circuitry configured to provide the re-key signal on activation of at least one of the keyed switch and the relay.

Further objects and advantages of the invention will become apparent from the Brief Description of the Drawings.

BRIEF DESCRIPTION OF THE DRAWINGS

For a more complete understanding of the present invention, and the advantages thereof, reference is now made to the following descriptions taken in conjunction with the accompanying drawings, in which:

FIGS. 13A-1, 13A-2 and 13B of various relay circuits used in the service panel on the PCB 24;

FIG. 14A-14D show more details of the microprocessor 70 and the schematic of the real time clock circuitry used by the service panel;

DETAILED DESCRIPTION OF ILLUSTRATIVE EMBODIMENTS

Figure 1A:
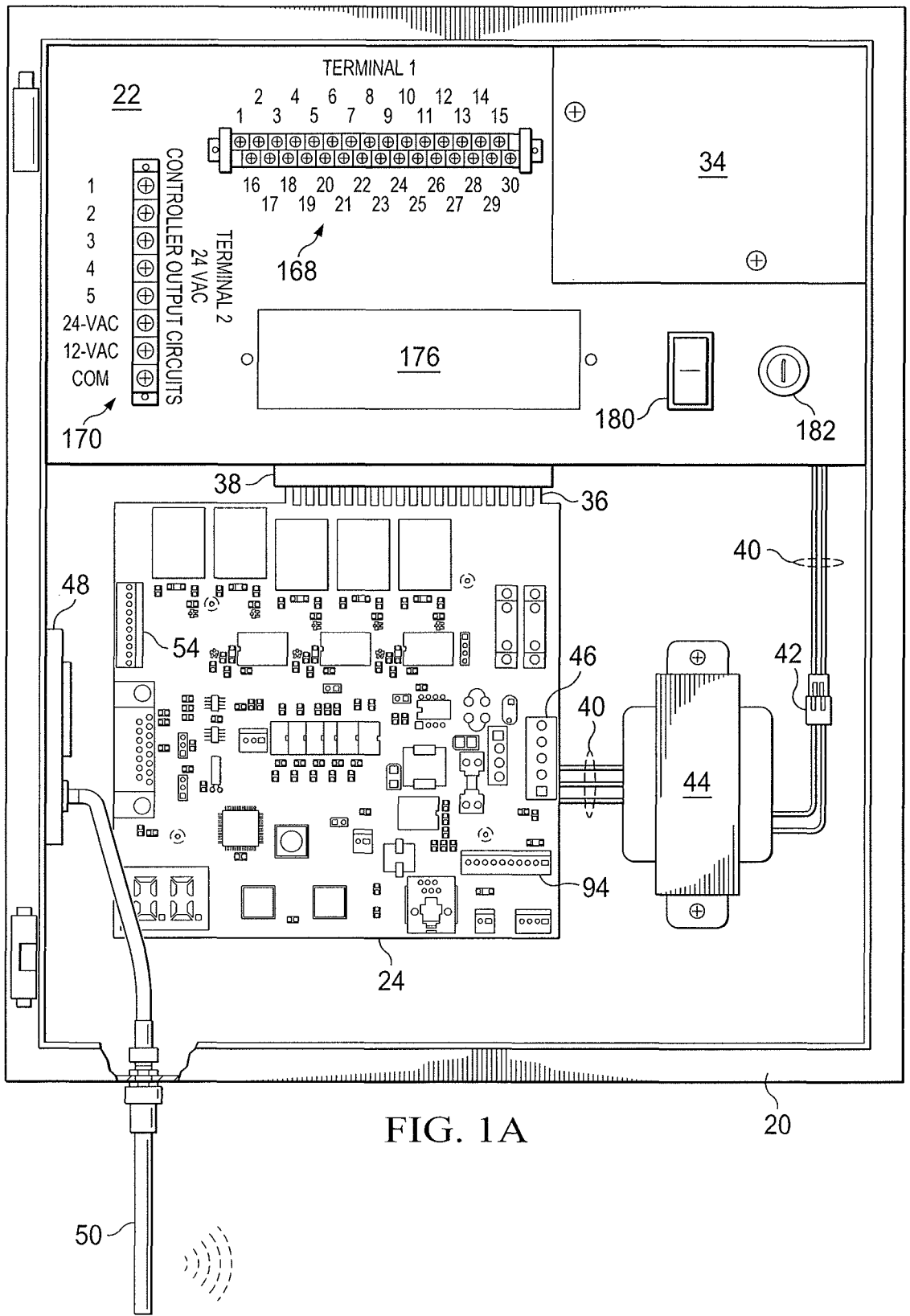
FIG. 1A shows a front view of the service panel.

As shown in FIG. 1A the present invention is a service panel 20 having a Control Panel 22 that supports a PCB 24 (printed circuit board 24) controlled by a microprocessor. The service panel 20 controls the various services typically used in a science classroom. The panel, doors and other components are preferably constructed of welded sheet metal, and contain the various components needed for the control of selected utilities.

Figure 2A:
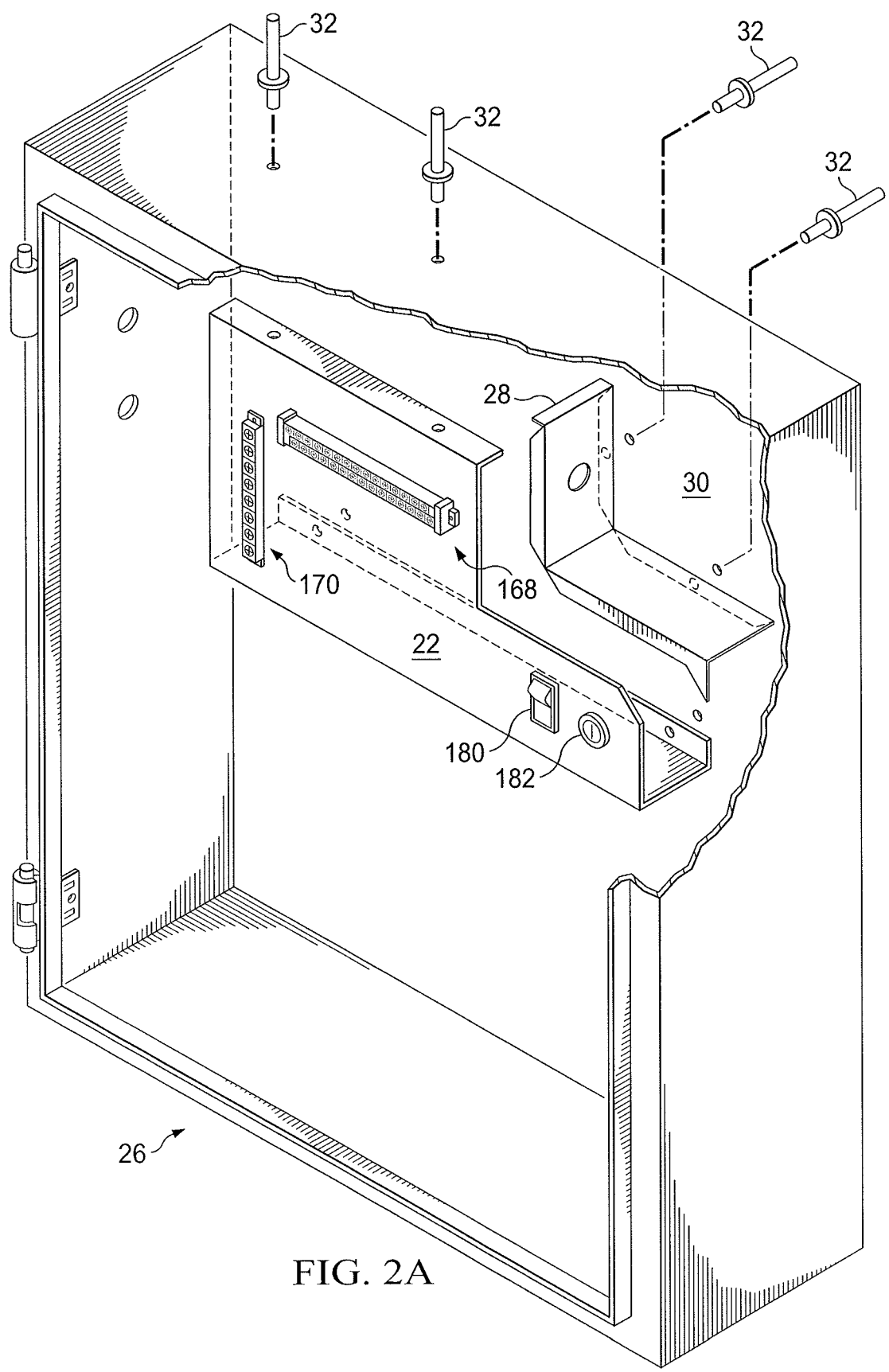
FIGS. 2A and 2B show the enclosure or cabinet assembly.
Figure 2B:
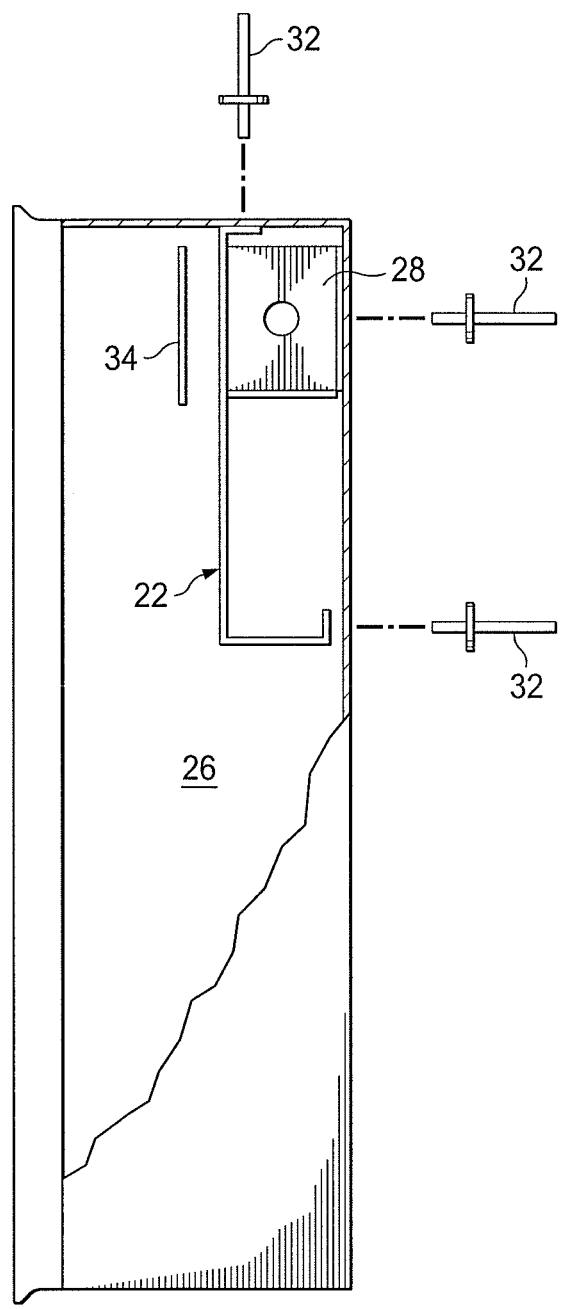

FIG. 2A illustrates a cut-away isometric view of the Service Panel enclosure 26 with the Control Panel 22 mounted in position. There is also shown a J-Box (jumper box) side 28 positioned (as an example only) in the upper corner that creates an area J-Box 30 in the void between the side piece 28, the Control Panel 22 and the adjoining sides of the enclosure 26. In this figure as well as the side view (FIG. 2B) of the enclosure 26, discussed below, the Control Panel 22 may be secured in the enclosure 26 by welding, with pop rivets 32 or any other suitable connection means.

Referring again to FIG. 1A there is shown a front view of the interior of the Service Panel 20 or enclosure 26 with the PCB 24 and Control Panel 22 in position, and with J-Box Cover 34 in place. As shown, PCB 24 is held in position and card-edge terminal 36 is inserted into card-edge connector 38. Also as shown, 120-VAC wiring leads 40 extends from the Control Panel 22 and terminates with transformer plug 42 at low voltage transformer 44. Low voltage wiring leads 40 extend from transformer 44 to the five pin terminal 46 on PCB 24.

Figures 1B, 1C:
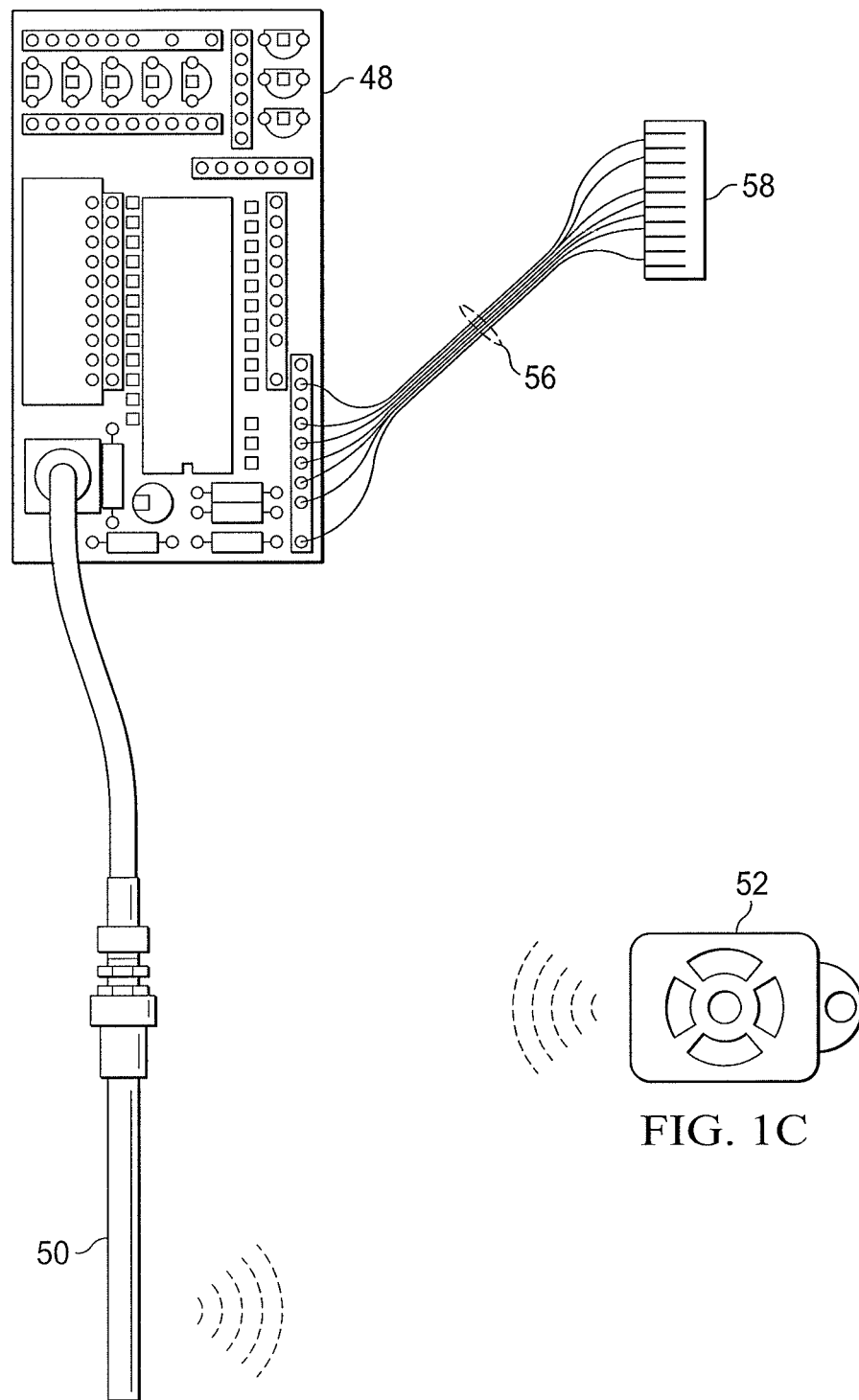
FIG. 1B shows the RF (Radio Frequency) PCB (Printed Circuit Board) and antenna.
FIG. 1C shows a hand held RF transmitter for controlling the service panel remotely.
Figure 3A:
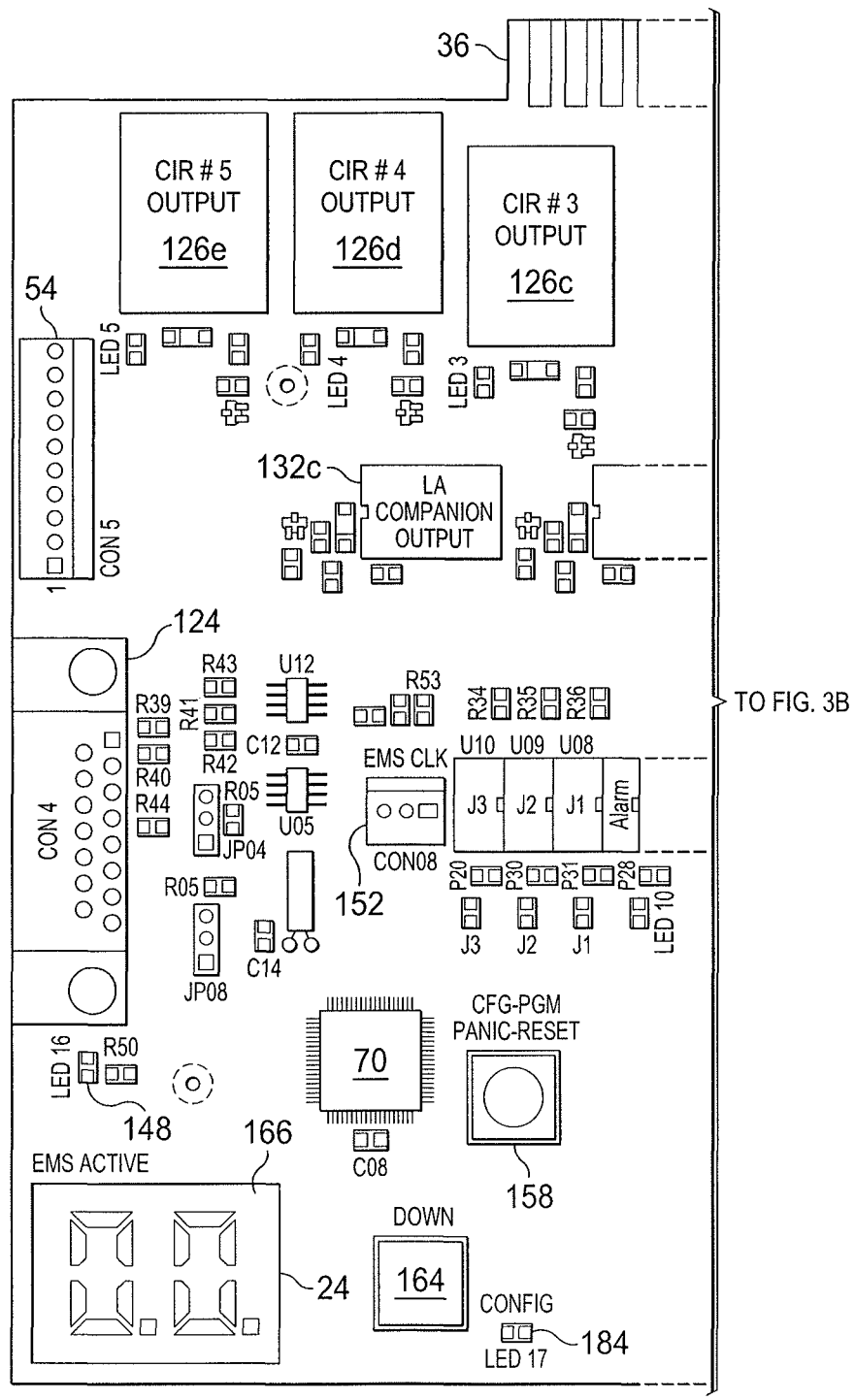
FIGS. 3A and 3B shows a first embodiment of the service panel PCB.
Figure 3B:
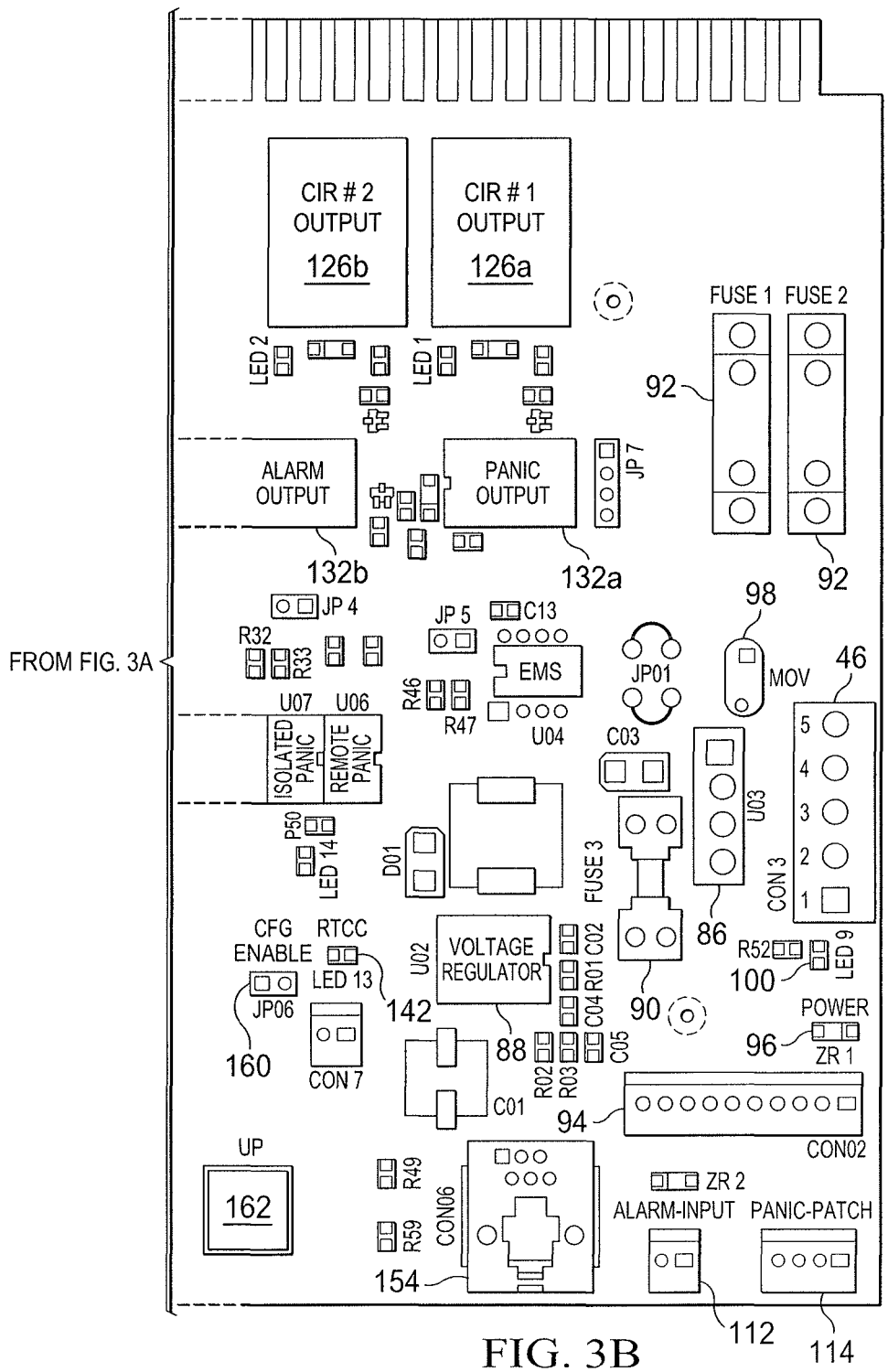

Also illustrated in FIG. 1B and mounted on the left sidewall of the enclosure 26 in FIG. 1A is a PCB 24 that includes RF antenna 50 and the necessary cabling and cable fittings necessary to support RF operations where the user has elected to incorporate a hand held Key-Module 52 shown in FIG. 1C for controlling the operation of the Service panel 20. Referring to FIGS. 3A and 3B, jumpers may be removed from between pins 5 and 6, between pins 7 and 8, and between pins 9 and 10 located on ten pin connector 54. Then, by simply plugging the RF Harness 56 with Connector 58 into connector 54 of PCB 24, the RF capabilities (as will be discussed below) will be enabled.

Hand-held controller or Key-Module 52 includes five buttons arranged in a circle, with four of them at the 3, 6, 9, and 12 o'clock positions, and the fifth in the center. The buttons located at the 9, 12, and 3 o'clock positions allow deactivation of the corresponding utility (circuit 1, circuit 2 and circuit 3), and the button at the 6 o'clock position is the Key-Module input. The button located in the center is the Panic input. It is noted that a circuit may only be remotely turned "ON" if a corresponding Service Control Switch on the door panel is also in the "ON" position. Thus, when a remote Key-Module 52 button is depressed, only the circuits that have the Service Control Switches on the door panel in the "ON" position will be activated. The particular arrangement of the five switches discussed above is, of course, only an example and the various functions could be assigned to any of the five switches as selected by the user.

Figure 4:
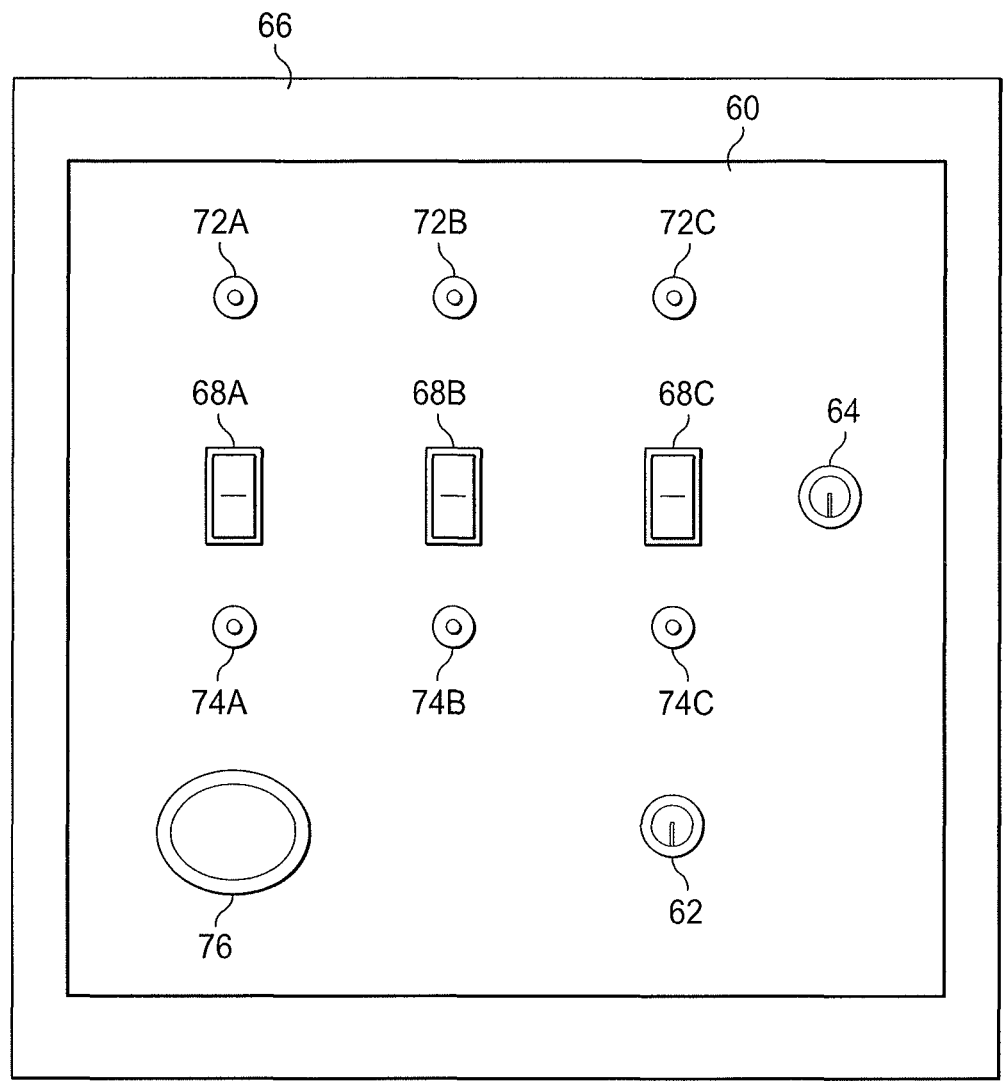
FIG. 4 shows a first embodiment of the door panel assembly.
Figure 5:
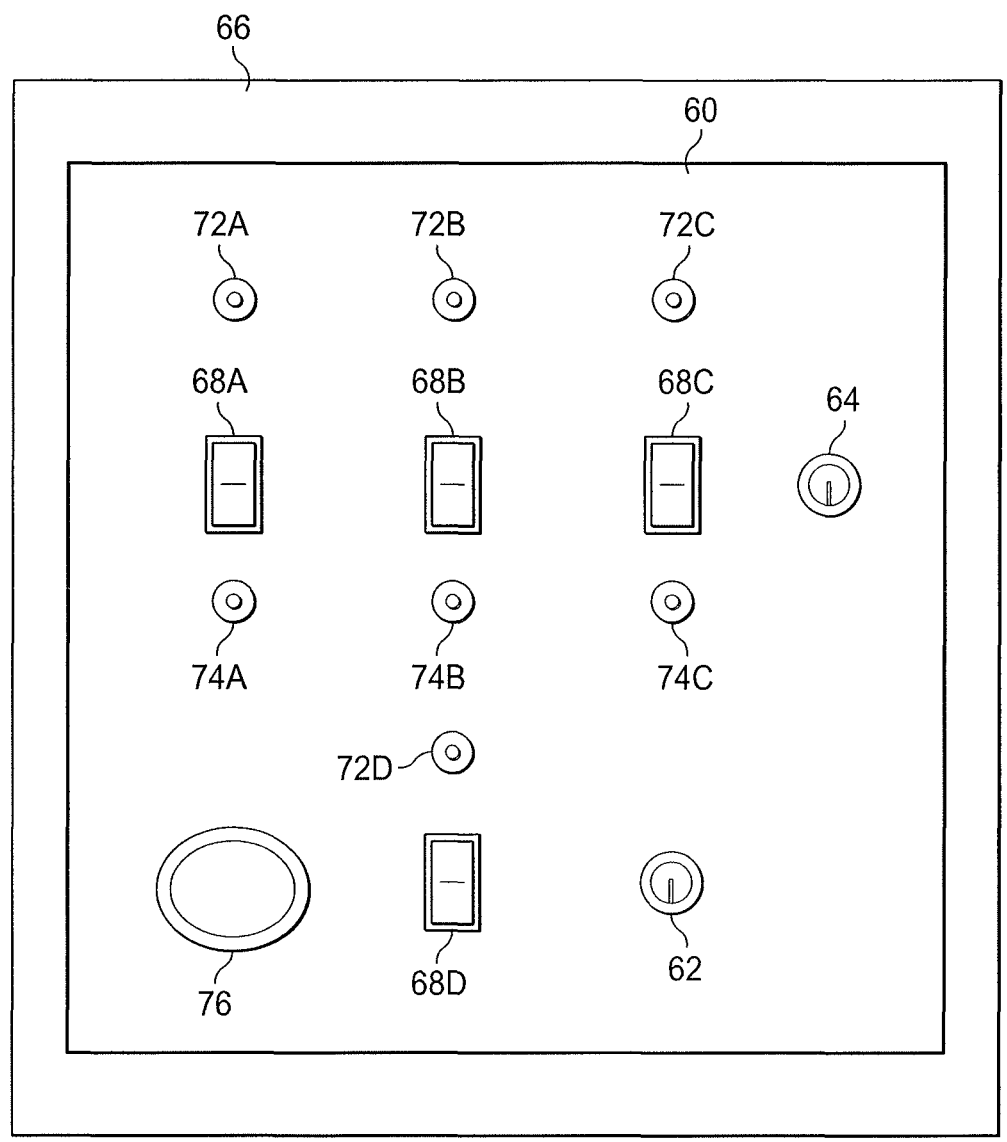
FIG. 5 shows a second embodiment of the door panel assembly.

FIGS. 4 and 5 illustrate two embodiments of the front of the door panel 60 that covers the Service Panel 20 or enclosure 26 and is discussed further below. FIG. 4 illustrates an embodiment that uses three separate switches that operate in combination with Keyed switch lock 62. A second Key lock 64 is used to keep closed and secure the door panel 60 to the enclosure. Door trim 66 is used to finish dress the field installation of the invention to a wall surface. FIG. 5 is similar to FIG. 4, but includes four switches that operate with Keyed switch lock 62.

As shown in FIGS. 4 and 5, there is illustrated an embodiment wherein door panel 60, as an example only, is affixed on the left side of the Service panel 20 to door trim 66 with a continuous hinge (not shown). The three control switches 68A, 68B, and 68C for controlling three different services are shown mounted on the face of the door panel 60. Various types of switches are suitable, but rocker type normally open, single pole, single throw or toggle or switches that when closed transmit a ground signal to the microprocessor 70 to be discussed in detail hereinafter have been found to be particularly suitable. In the illustrated example, one switch may control, for example, the electrical service, the second may control the domestic cold water service while the third may control the gas service. Above each control switch is a first indicator (LED) 72A, 72B, and 72C that shows whether the service is in the active state "ON" or not. Below each control switch is a second indicator (LED) 74A, 74B, and 74C to indicate if the service was active when the EMS signal has been withdrawn. The second key lock 64 is mounted at the side opposite the continuous hinge (not shown) and keeps the door closed and locked to maintain proper security. Keyed switch 62 is positioned on the lower area of the door panel, and may be, for example only, a normally open, key activated single pole, single throw switch with contacts that can only be momentary moved from the OFF position. Panic button assembly 76 is located adjacent to Keyed switch 62. Panic button 76 is of a conventional design that is typically used in similar conventional applications. It is a normally open single pole momentary push button switch. Because of its common usage in the electrical industry, no further description is provided. All switches, lights and locks are mounted to the door panel using common means and methods as provided by the manufacturers of these components.

Figure 6A:
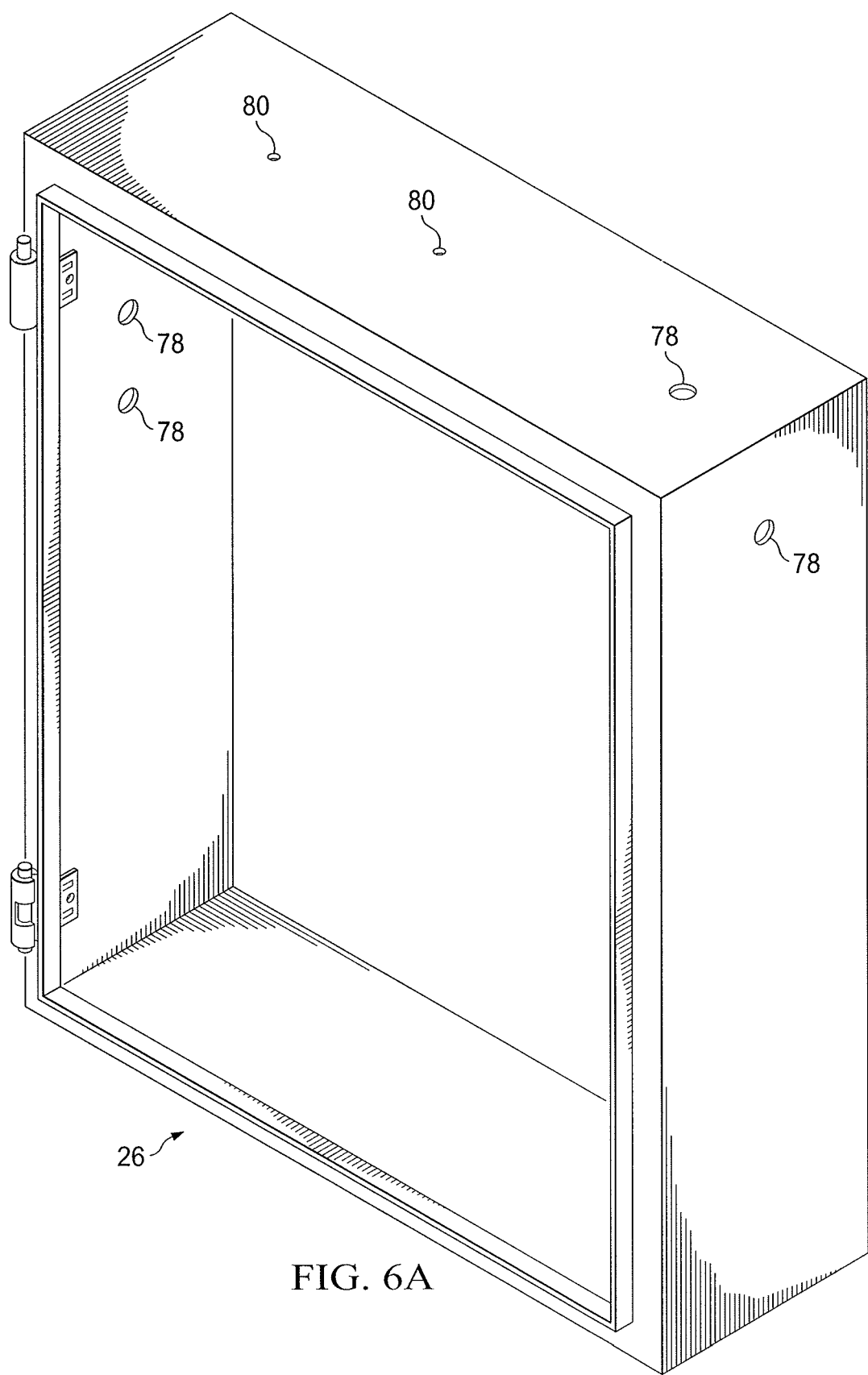
FIGS. 6A and 6B shows isometric views of components of the enclosure assembly of FIG. 2A.
Figure 6B:
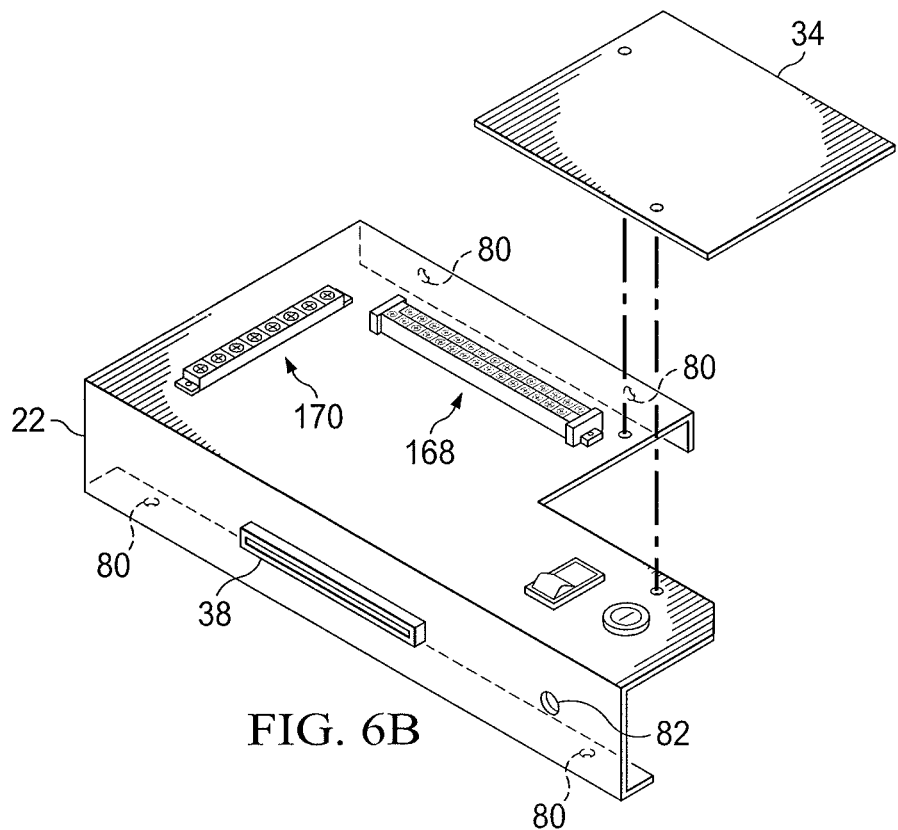

FIGS. 6A & 6I displays isometric views of various components of the enclosure 26 formed from sheet metal. Conduit knockouts 78 are positioned along the top and sides in order to enable the connection of field installed conduit to house the various field provided wiring needed to operate the device. Isometric view of Control Panel 22 illustrates the forming of this panel and presence of pop rivet holes 80, Panel hole 82, and other holes required to accept the components fitted to the panel in order to make it workable within the enclosure. J-Box side 28 and J-Box cover 34 are also shown.

Figure 7A:
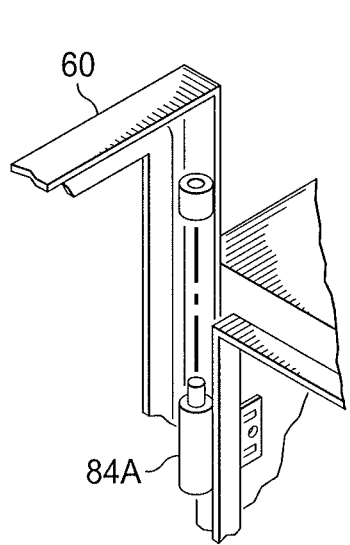
FIGS. 7A and 7B shows the door panel hinge assembly.
Figure 7B:
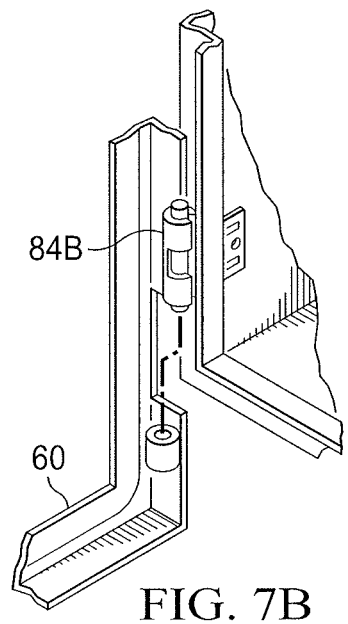

FIGS. 7A and 7B illustrate upper hinge pin 84A and lower hinge pin 84B. Pin 84A is a fixed post that accepts a round collar on door panel 60. Pin 84B is a "twist-and-lock" type spring loaded pin mechanism that once slid into the lower collar on door panel 60 and then turned and locked keeps this panel in place.

Figure 8:
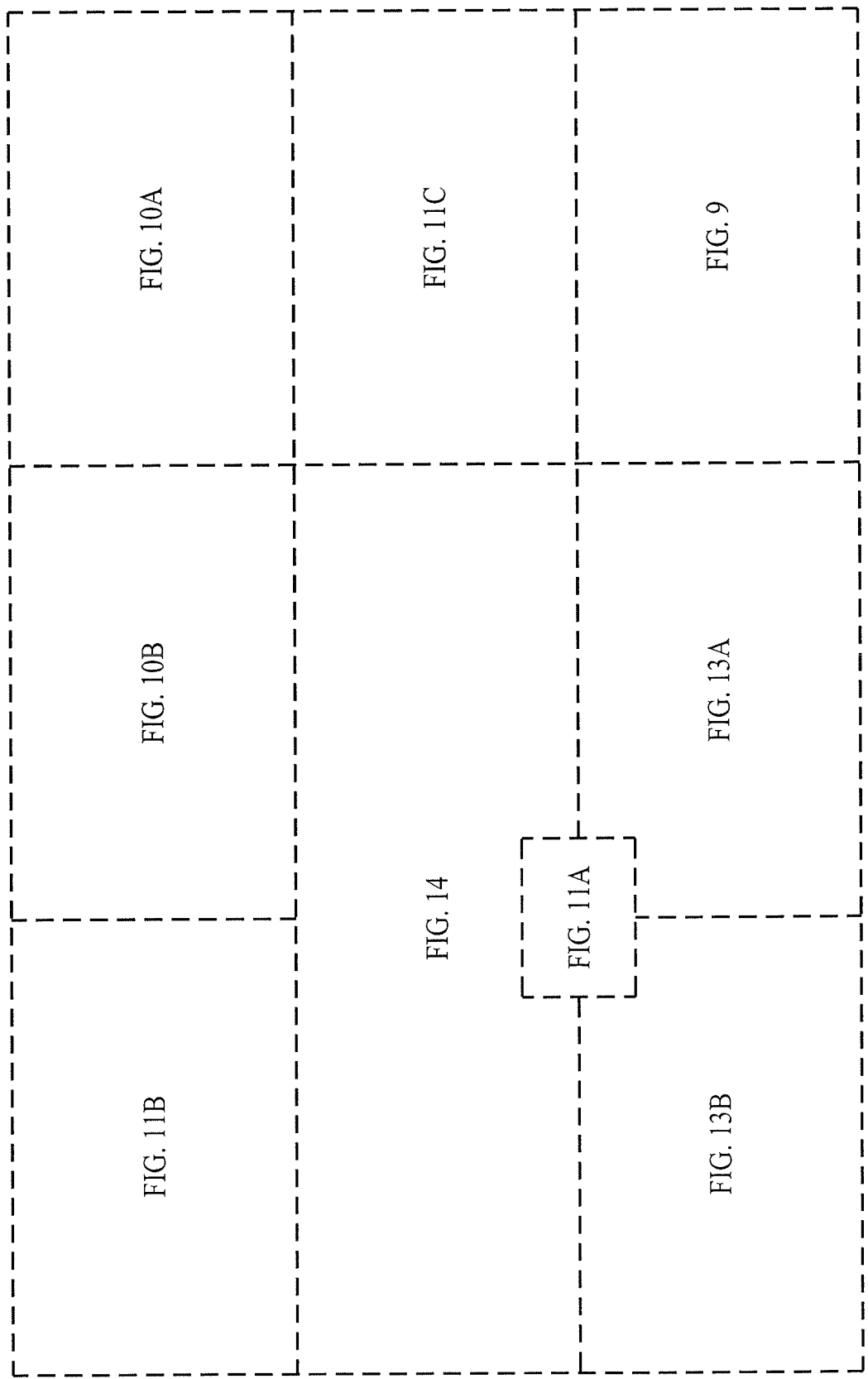
FIG. 8 shows a detailed breakdown of the schematic of the PCB of FIG. 3.

A primary component of the invention is the printed circuit board or PCB 24 shown in FIG. 3. PCB 24 consists of many components including a power supply, interface means, indicators, digital display, and data storage/processor means. FIG. 8 is a layout of the PCB and referenced figures of detailed circuit of the BCB.

FIG. 3 is a display of the layout of the components on PCB 24. For example, referring to FIGS. 1A, 3A, 3B and 9 together, there is shown a circuit diagram of the service panel power supply. The circuit includes a five pin terminal 46 through which a 24 volt alternating current (24-VAC) is applied from transformer 44 in FIG. 1A. Rectifier 86 converts the current to direct current (dc), voltage regulator 88 and associated circuitry establishes the required operating voltage, fuse 90 protects the dc circuitry of the printed circuit board 24 from short circuit and over current. Two (2) other fuses 92 protect the 24-VAC output power circuitry from short circuit and over current. Ten (10) pin connector 94 provides for a dc output terminal as well as serving as a port for future expansion of the operational capabilities of the invention. Zener diode 96 and MOV (metal oxide varistor) 98 provide for stable current during operation. LED 100 illuminates when the power supply is operational. The 24-VAC output power buss wires 102 connect the circuitry for output circuits to the 24-VAC power circuitry.

Figure 10A:
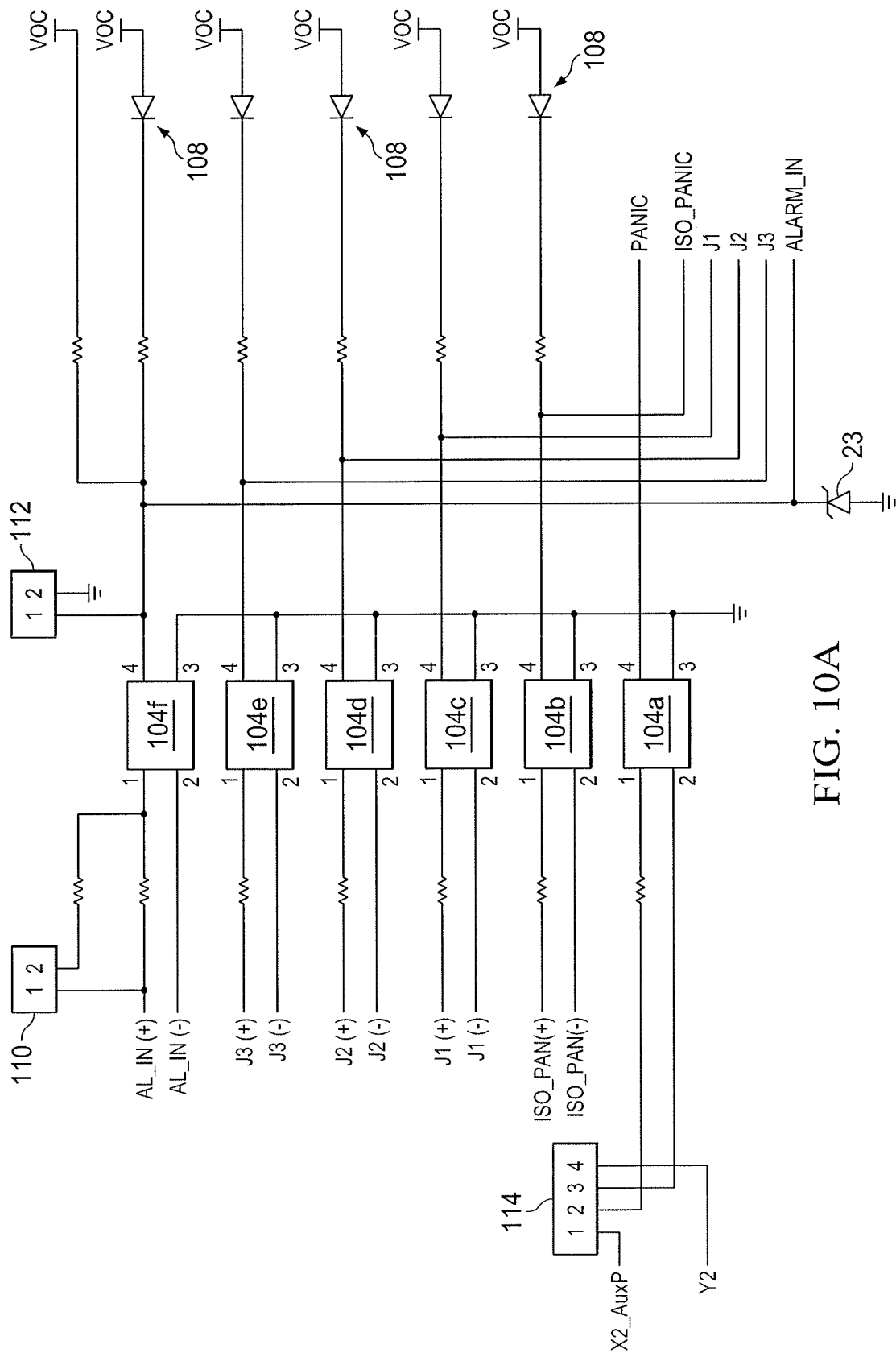
FIGS. 10A and 10B are electrical schematics of the opto-isolator circuits used to provide an interface for connecting external devices and systems to the service panel on the PCB 24.
Figure 10B:
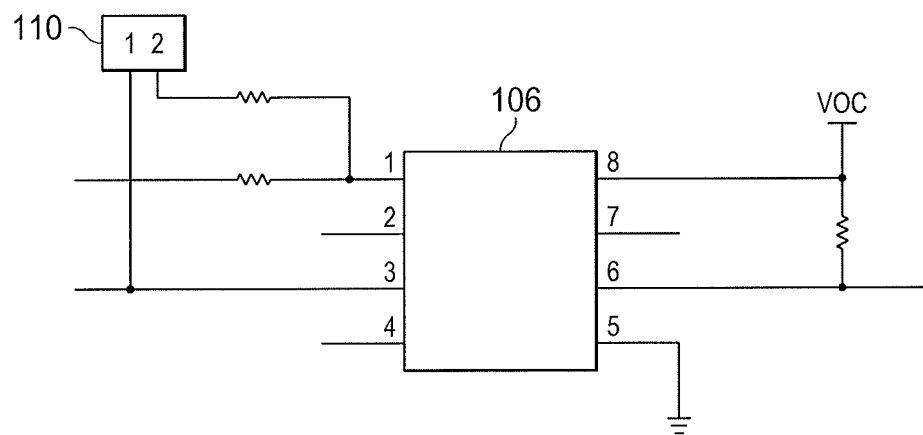

Likewise, turning to FIGS. 10A and 10B in combination with FIGS. 3A and 3B a series of six four (4) pin opto-isolators 104 along with an eight (8) pin opto-isolator 106 and its support circuitry provides the means whereby inputs from various other operating and monitoring devices and systems can interface with the PCB. LEDs 108, shown in FIG. 10A illuminate when opto-isolators 104b-104f are active. Two (2) jump post 110 provide the means to accept either a dc voltage ranging between 3 and 5 volts or a 24-VAC in order to operate opto-isolators 104a-104f or opto-isolator 106. JP 112 that is connected to the Alarm Input circuitry provides the alternative means whereby a field provided alarm relay can be used to interface between that system and the PCB. These variations in techniques employed in field provide advantageous options.

Four (4) pin JP 114 is provided to allow for an optional secondary relay to be incorporated into the circuitry where a remote momentary panic button can be incorporated into the field design of an operating system for the invention. One leg of the operating power for the opto-isolator 104a is routed through the card-edge terminal and returned to opto-isolator 104a when the panic button 76 is pressed. The other leg is connected directly to opto-isolator 104a. Placing jumpers across pins 1-2 and 3-4 of JP 114 provides a closed circuit. Removing these jumpers and inserting a wiring harness terminating at a secondary relay permits a simple means whereby any transient voltage that may be present in field wiring can be blocked.

According to one embodiment, opto-isolator 104b is utilized for connection of a field provided 24 volt output of a device intended to be monitored by the invention with the intention of advancing the system of this invention to the PANIC state when a signal is present, opto-isolators 104e provides the same function, and opto-isolators 104c and 104d provide circuitry to receive low voltage signals for fuel gas detection devices. It is respectfully suggested that the monitoring of such devices by an automatic utility control device such as provided with this invention enhances overall safety in the operating environment due to the capabilities of the control device to turn OFF circuits controlling the fuel gas as well as other related utilities when the presence of raw gas is detected.

Figure 11A:
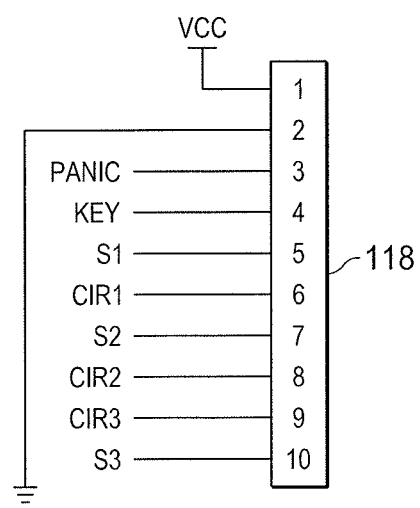
FIGS. 11A, 11B and 11C illustrate various connectors for connecting components to the service panel on the PCB 24.
Figure 11B:
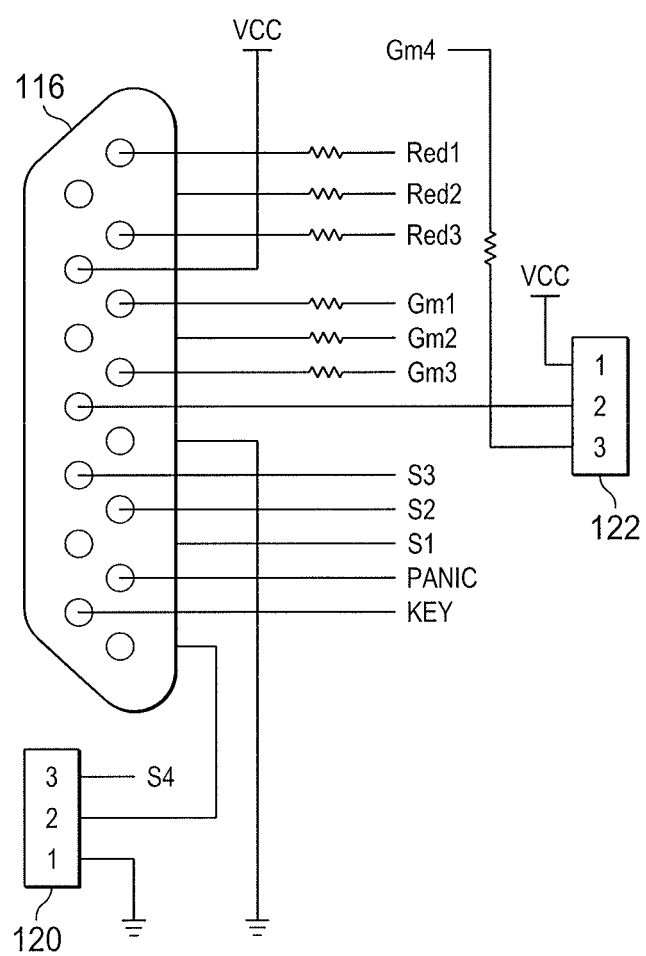
Figure 11C:
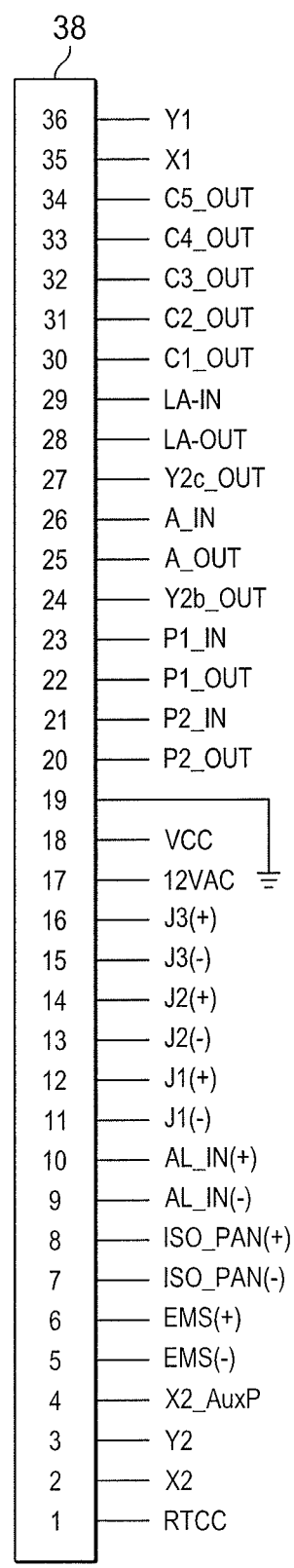

In FIG. 1B, illustrates the interface between a fifteen pin connector 116 that operates with the door panel 60 of FIGS. 4 and 5. As mentioned above, the door panel includes control switches, a momentary key switch 62, a momentary push panic button 76 and LED illuminators 72A-C and 74A-C all connected to the PCB 24. Also shown in FIG. 11A is a ten (10) pin connector 118 that permits the radio frequency (RF) module discussed above be interfaced into the operation of the device. JP 120 and JP 122 allow for alternative styles of the connected door panel. Panels having three (3) switches will have a jumper placed across pins 1 and 2 of JP 122. Alternatively, placing jumpers across pins 3 and 2 on each of JP's 120 and 122 supports the door panel containing four (4) switches. FIG. 11C shows the edge connector 38.

Figure 12A:
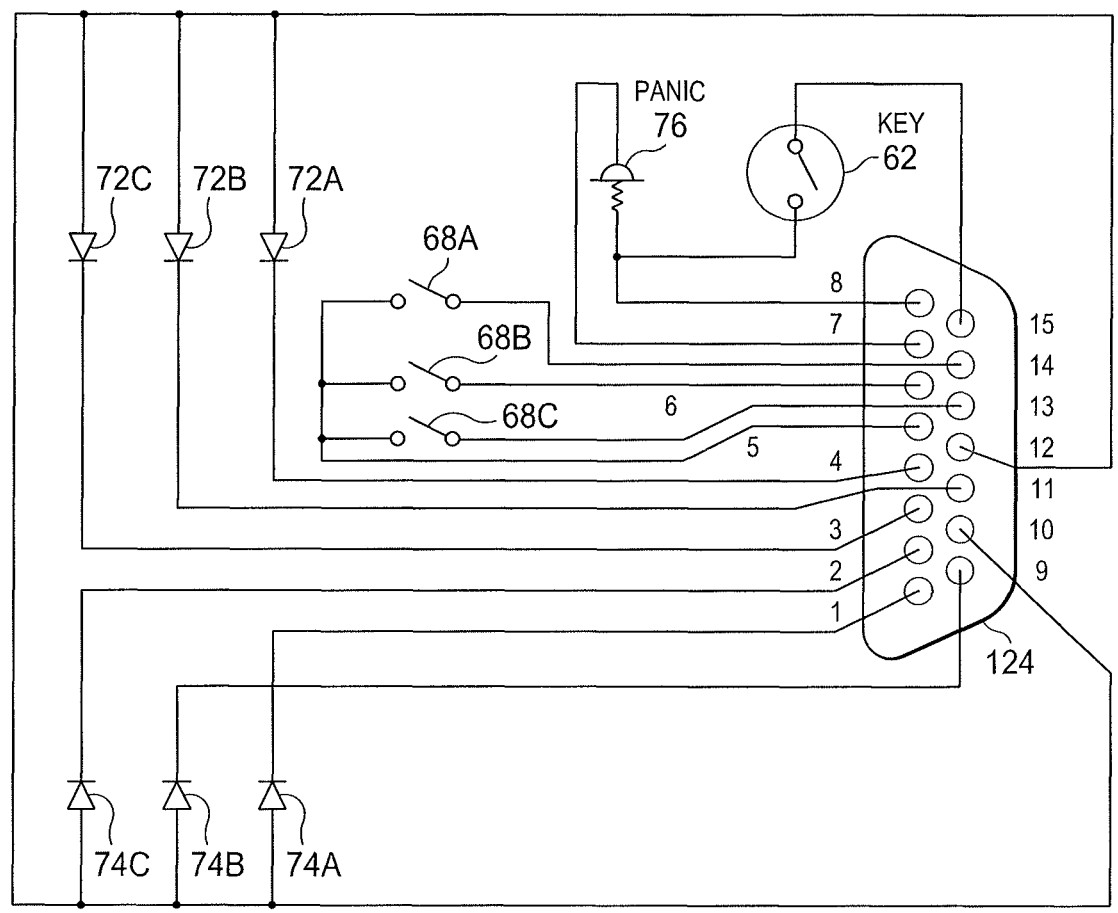
FIGS. 12A, and 12B illustrate the wiring schematics for the door panels shown in FIGS. 4 and 5 respectively.
Figure 12B:
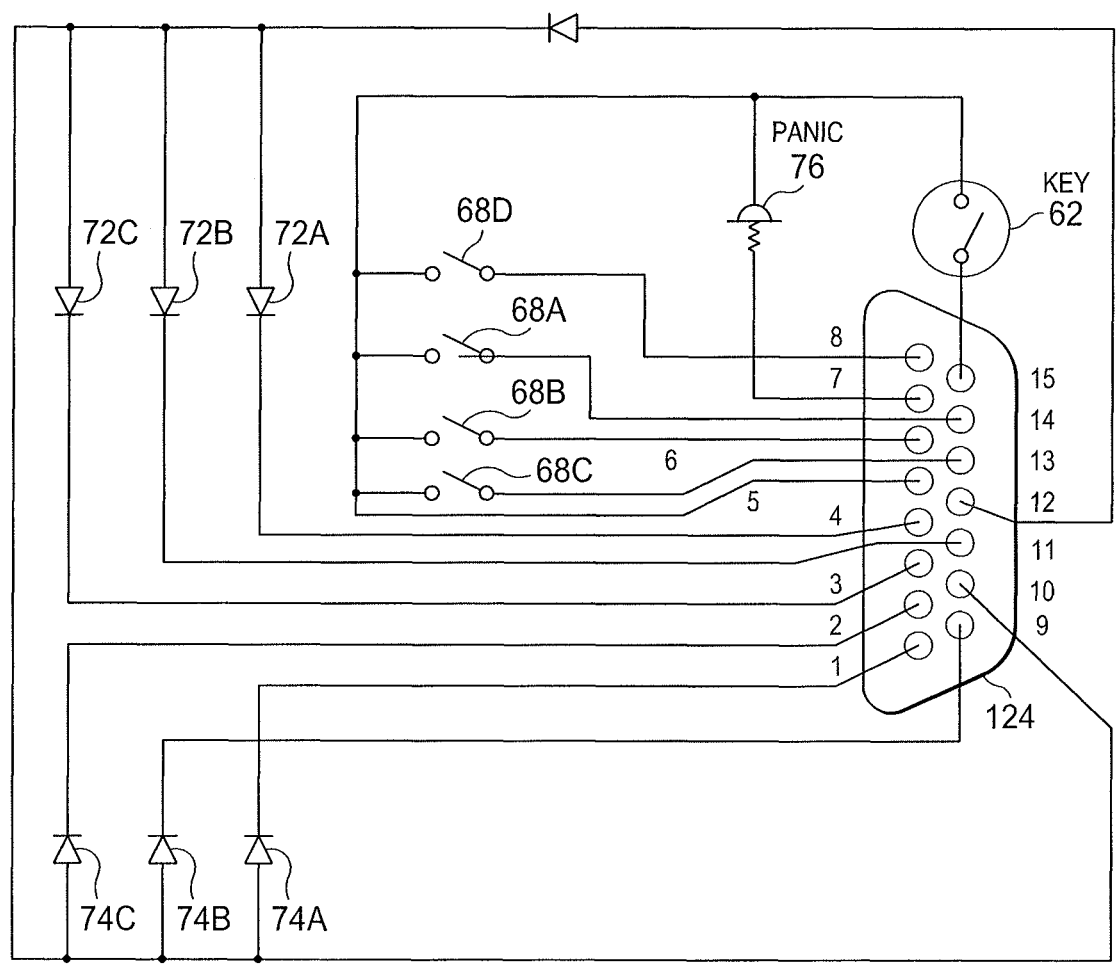

FIGS. 12A and 12B are the wiring schematics for the two door panels of the invention. FIG. 12A illustrates a three (3) switch panel while FIG. 12B shows a four (4) switch panel. Control switches 68A, B and C are normally opened single poll, single throw toggle switches that when closed transmit a ground signal to the microprocessor. Also as was discussed above, Key switch lock 62 is a momentary normally open switch and Panic button 76 is a momentary normally open switch. Each of these switches transmits a ground signal to the microprocessor 70 when closed. All wiring terminates at 15 pin D-Sub Socket 124. FIGS. 12A and 12B also show the different wiring for three and four switch styles and as discussed above how jumpers at the JPs 120 and 122 shown in FIG. 11B are used to change the source of wiring used for the components in their respective schematics.

In the case of a PANIC or Alarm mode all of the LEDs will turn on. When a signal from a Gas Detector is provided to opto-isolator 104c the Red LED 74C of any circuit configured to respond OFF to that signal will flash. Green LED 72 and Red LED 74 for the affected circuit 2 will alternately flash when a signal from a Gas Pressure Sensor is detected at opto-isolator 104d. These variations of illumination enable the user of the invention to determine the present operating mode of the device.

Ten (10) pin connector 118 of FIG. 11A permits the inclusion of the RF connector in the system. VCC and ground are positioned at pins 1 and 2. Panic and key signals originating from connector 116 are terminated at the microprocessor 70 as well as pins 3 and 4. Control switches 68A, 68B, and 68C are routed through the remaining pins in such a way that by placing jumpers across the respective pins; 5-6, 7-8, and 9-10; provide connections to the microprocessor 70. However, by removing these jumpers and connecting a wiring harness 56 provided with special RF PCB 48, radio operated control of the primary three circuits can be achieved.

Card-edge terminal 36 also allows for the distribution of wiring leads terminating from remote sources to be interfaced with the invention as well as wiring leads for outputs to be distributed to output terminals. These wiring leads terminate at terminals that permit appropriate field connections.

Figures 1, 13A:
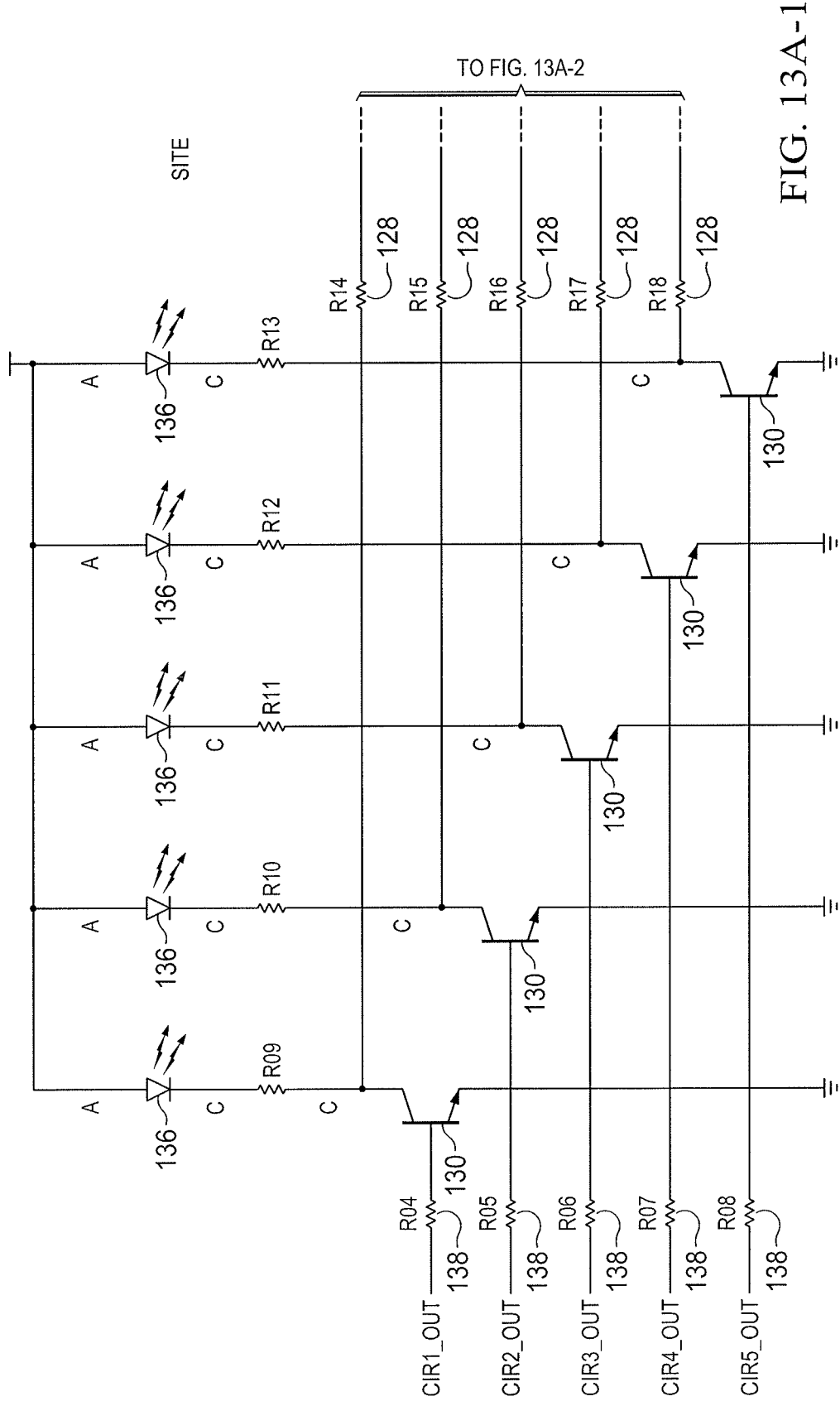

FIGS. 13A-1 and 13A-2 and illustrates a series of five (5) output relays 126a-126e to operate the controlled utilities and equipment. Each is connected in circuitry from their respective output pin on the microprocessor 70 through current limiting resistors 128, to the base of respective switching transistors 130.

Figure 13B:
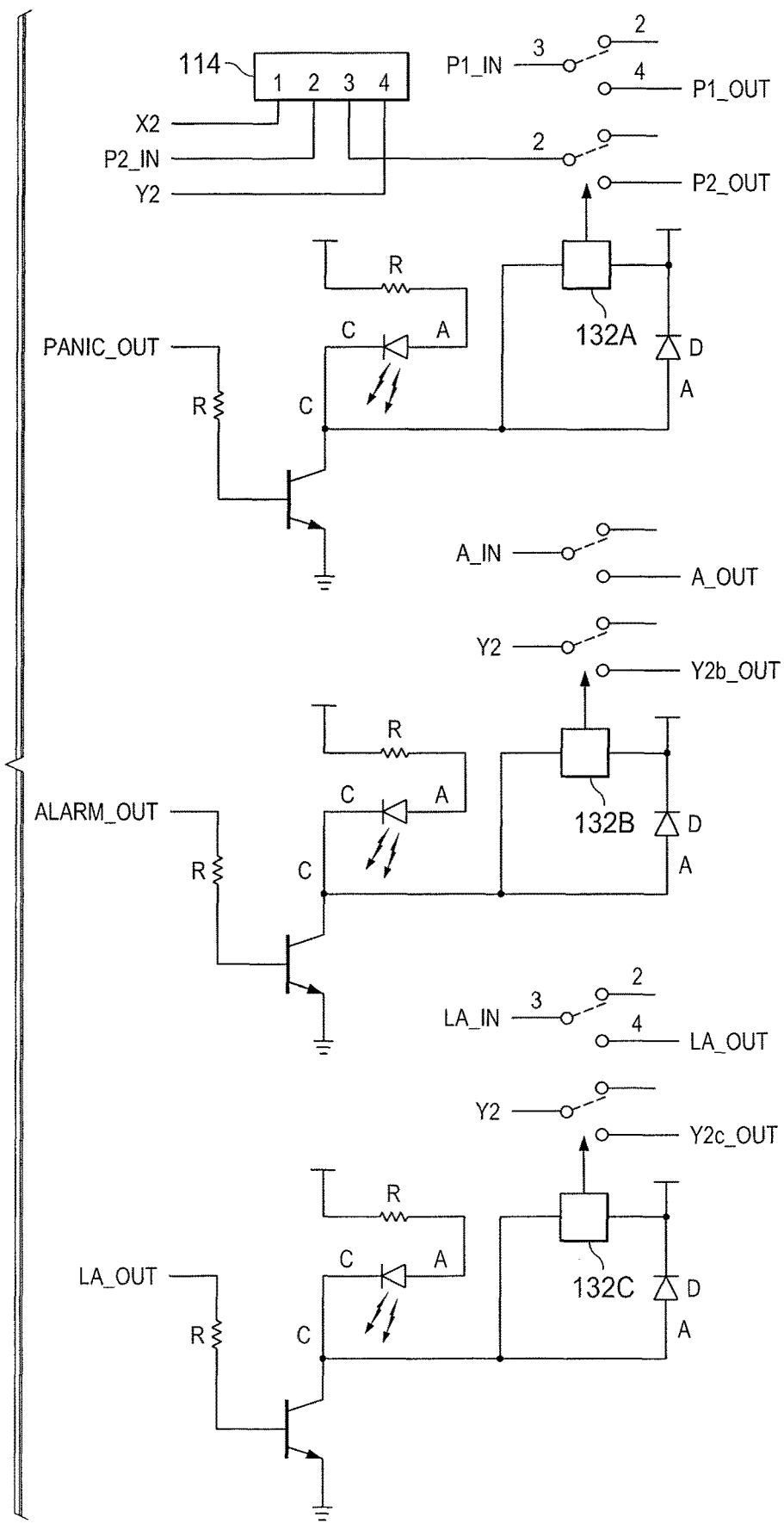
Figure 14A:
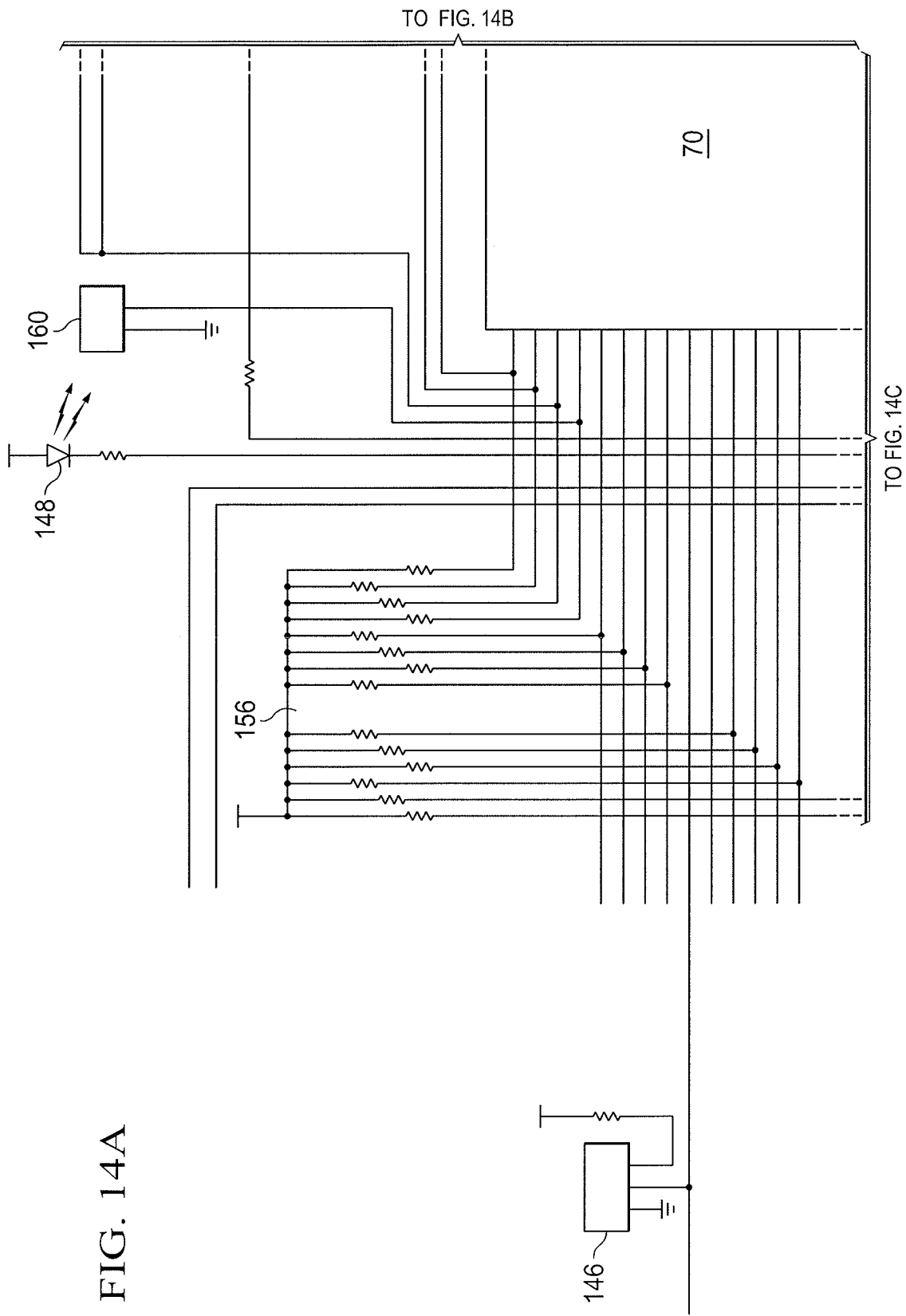
Figure 14B:
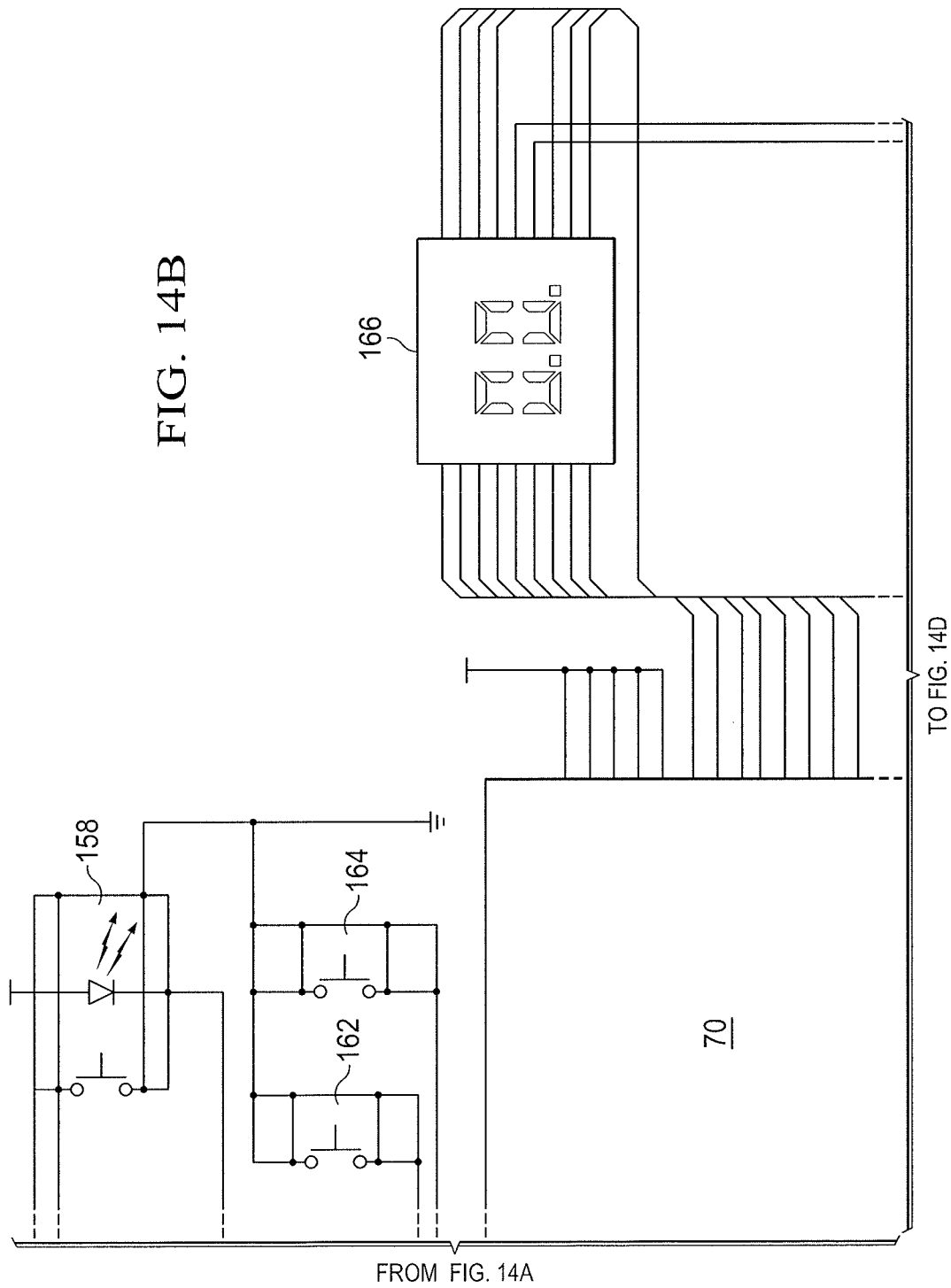
Figure 14D:
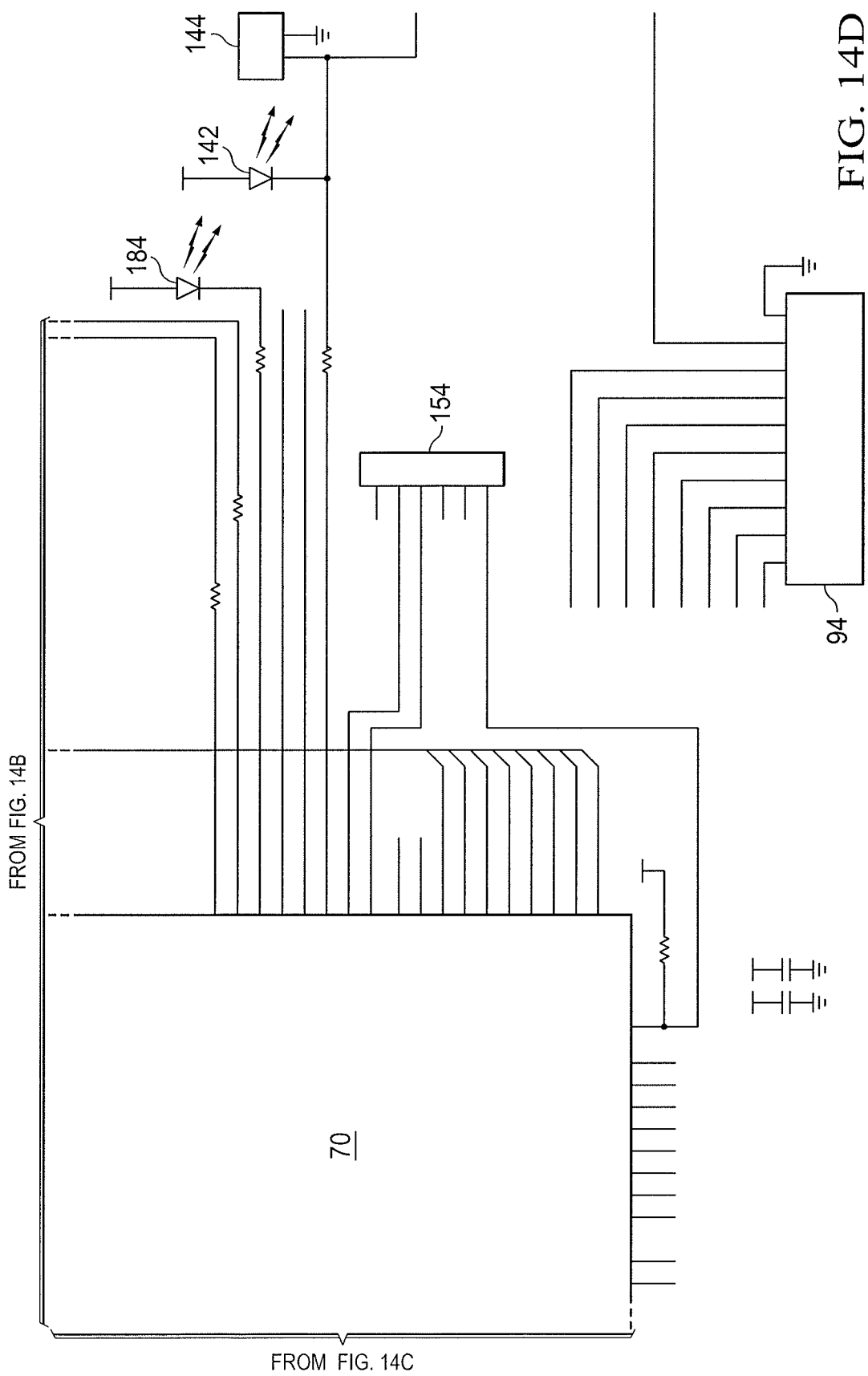

Also shown in FIG. 13B are three (3) double poll signaling relays 132. These relays provide for outgoing communication to other devices or systems. Relay 132B closes on receipt of an alarm signal causing an Alarm state and relay 132-A closes upon the pressing of the door panel panic button or receipt of a remote panic signal via opto-isolator 104a. Relay 132C closes upon receipt of an isolated panic signal or momentarily upon pressing of a panic button.

One side of each of these terminals provides for a dry-contact at card-edge terminal 36. The other side is a 24-VAC output terminal at this same terminal. Relay 132-b, mentioned above is intended for communication with other control devices that may operate only when an ALARM state exists. Relay 132-c is intended to communicate a form of PANIC state from the primary unit within a system to other slave units. In this way having an emergency effect operation of the primary unit will shut OFF operation for any units connected in a Master to Slave manner.

Relay 132-a closes upon the system of the invention changing to the PANIC state. Four (4) pin JP 114 of FIG. 10A permits one side of the poles to be transformed from a dry-contact type of terminal to a 24-VAC output terminal. Placing a single jumper across pins 2 and 3 results in circuitry whereby one side is a dry-count at the corresponding pins 20 and 21 on card-edge terminal 36. Placing two jumpers across these four pins creates the circuitry for 24-VAC output to these same pins on the card-edge terminal. The other side of Relay 132-a is always used as a dry-contact terminal and terminate at pins 22 and 23 on the card-edge terminal 36. It is believed that the options described herein provide a superior setup over a set of fixed use terminals for communication with other devices.

Returning to FIG. 13A, flyback diodes 134 are connected across the relay's coil, and LEDs 136 of FIG. 13A illuminate to indicate the operation of each relay. Current limiting resistors 138 are provided at the base connection of each transistor.

FIGS. 14A-14D illustrates the RTC (real time clock) circuitry and includes the RTCC (real time clock controller) JP 140 and RTCC LED 142. JP 144 permits the use of the RTCC clocking signal for possible add on features. RTCC 142 pulses at about every two seconds and is used to determine the proper operation of processing portion and timing functions of the PCB 24. EMS JP 146 permits a jumper to be placed across pins 1 and 2 that will short the EMS signal to ground for the purpose of field testing of the device prior to the introduction of an actual EMS signal. If the EMS configuration position is not set to "1—Active ON EMS" then this jumper is not needed. The "EMS active" LED 148 illuminates when the EMS input signal is present.

Also as shown in FIG. 14, the circuitry includes the data storage/processor comprised of microprocessor 70, two data storage devices 150A and 150B, Real Time Clock (RTCC) 152, and Programming terminal 154 whereby the needed programming language and data can be loaded onto the PCB. One of these storage devices maintains the initial programming configuration data. The other stores current data settings. Pull up resistors 156 are included in the circuitry for each input pin on microprocessor 70. RTCC 152 provides the clock function for timing sequences of the program.

The momentary illuminating button or panic reset button 158 is used to provide a reset signal to the device after a PANIC or Alarm state has occurred. This button illuminates when in either of these two states. Also when a jumper is placed across the pins of "Config Enabled" Jumper Post 160, this button is used in the configuration process. UP push button 162 and DOWN push button 164 enable the configuration or programming of the microprocessor.

Once preliminary code and data is loaded into the data storage/processor the device will function according to the configurations established at the time of manufacturing. In order to change the operating configurations for the processor, the user will first enter the configuration mode for the device. By having the power supply ON, placing a jumper across the two pins of Jumper Post 160, and then pressing the panic reset button 158, the configuration mode is entered. A "Config Active" LED 184 illuminates when in this mode. Display 166 (also shown in FIG. 3) is a two (2) position, seven segment LED display that permits the identification of configuration positions from "0" to "99" as well as the configuration options for each position.

Once in this mode, pressing the UP Button 162 or DOWN button 164 on the PCB 24 (FIG. 3) will move through the configuration positions. According to the configuration charts in the following Tables 1 and 2, the user will select a position desired to be modified. Pressing the panic reset button 158 again displays the state of the specific position. Pressing either the UP or DOWN button will adjust the setting according to the chart. Once the desired change has been made, the user once again presses the button 158 in order to save the current setting.

Through this process, the user may alter any operating configuration as stated in the chart. If after time, the user desires to return all current configuration settings to those provided during manufacturing, by selecting position two (2) and then changing the setting to one (1) and then pressing the RESET button 158, all configuration setting will be restored to their original setting.

In order to demonstrate the advantage of this programming feature, the following example is offered. Suppose a circuit is factory set as an exhaust fan circuit with no additional features available. The user may reconfigure the circuit to respond to a fuel gas detector. The user also desires to have this circuit operate for a specific time and then turn OFF at the expiration of this desired time. This is achievable by selecting the desired positions per the configuration chart and then changing the settings to the desired setting. Once changes are made, the exhaust fan will now operate automatically once a fuel gas detector's signal is received. Also, when this fan is operated by switch, after a determined time period the fan will turn OFF.

The microprocessor 70 may, in an embodiment, be a programmable logic controller (PLC) with a logic board that includes a microcontroller. PLC programming interprets inputs from various sources and activates and deactivates relay outputs to control utilities through relays cutoffs, control devices and the like. For example, PLC programming may use relay ladder logic, but may also use state machine logic, procedural logic, real-time programming, or another programming system. The PLC may be utilized with a standard switched door panels or with a touchscreen. Additionally, a PLC can be expanded to accept any number of inputs and outputs allowing flexibility when designing and programming new controller models.

An embodiment of the utility controller has a touchscreen controlling the utility controller and presenting a human-machine interface (HMI) to users. The HMI permits operation of the utility controller without the need of standard switches and LEDs. The functions of the utility controller are controlled by the microprocessor 70, with the touchscreen used to impart a more flexible and customizable interface. Touchscreen programming allows for unlimited options for activating services and visual design. A touchscreen is programmed to work in conjunction with a PLC mounted inside the utility controller. A touchscreen eliminates the need for custom labeling on door panels because changes can be easily made through programming.

The utility controller may have a communications device such as an ethernet or Wi-Fi connection that allows for monitoring, operation, or updating of the utility controller. The communications device may be integrated into the touchscreen, into the microcontroller or PLC, or may be a separate board or device external to the enclosure or integrated into the PCB 24. Additionally, a USB Port may be integrated into the utility controller to allow for storage devices (thumb drives) to store data for records or for updating the utility controller.

Figure 15A:
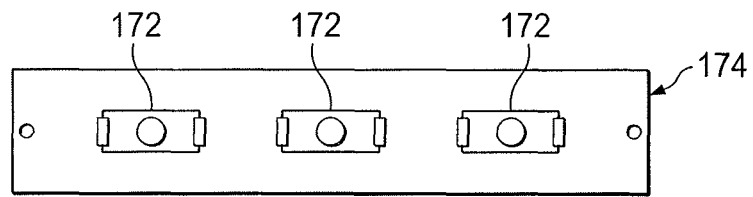
FIGS. 15A and 15B illustrate the Pin-out connections between the Card-edge connector for the PCB and the communication and output terminal strips.
Figure 15B:
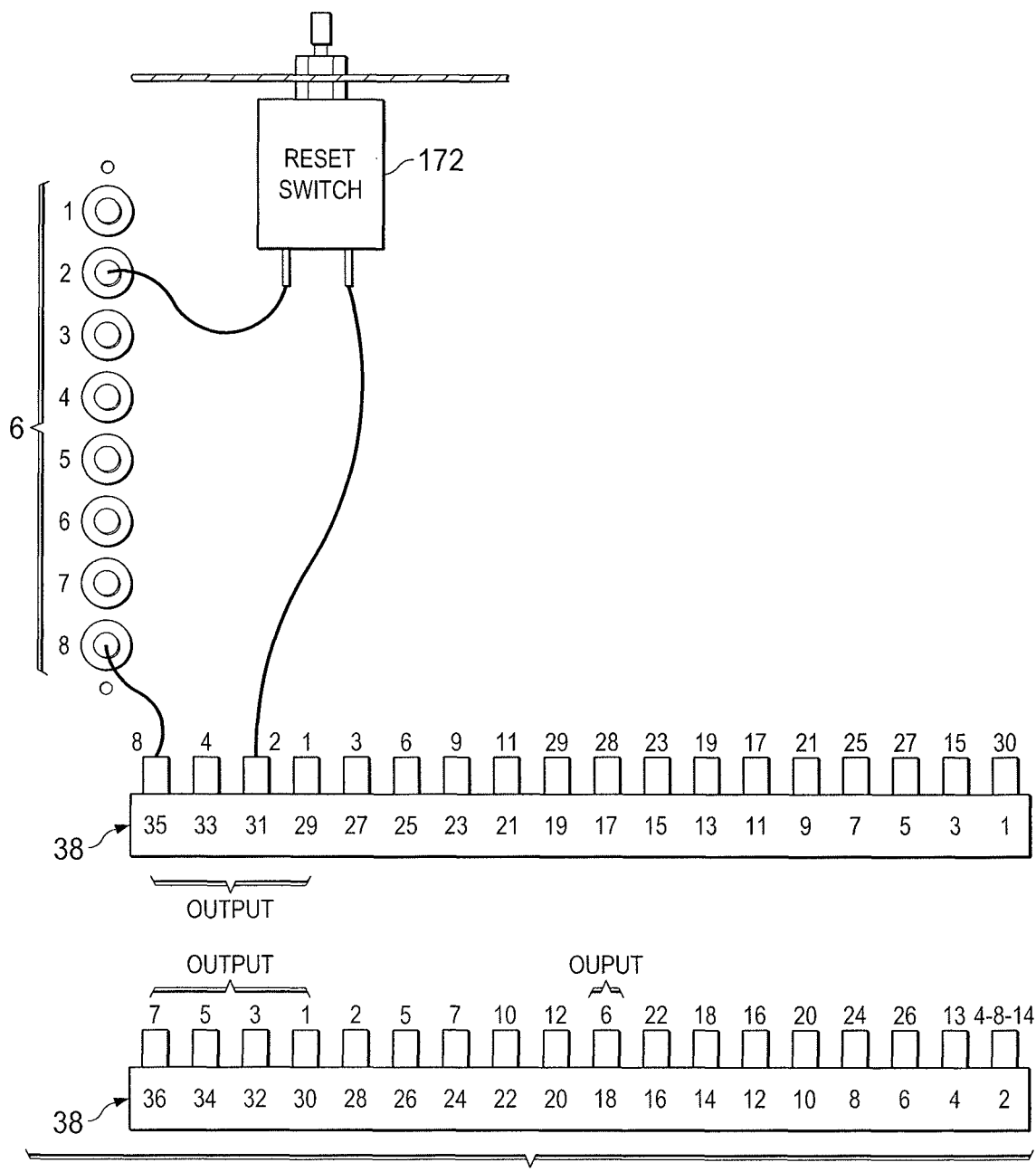
Figure 16:
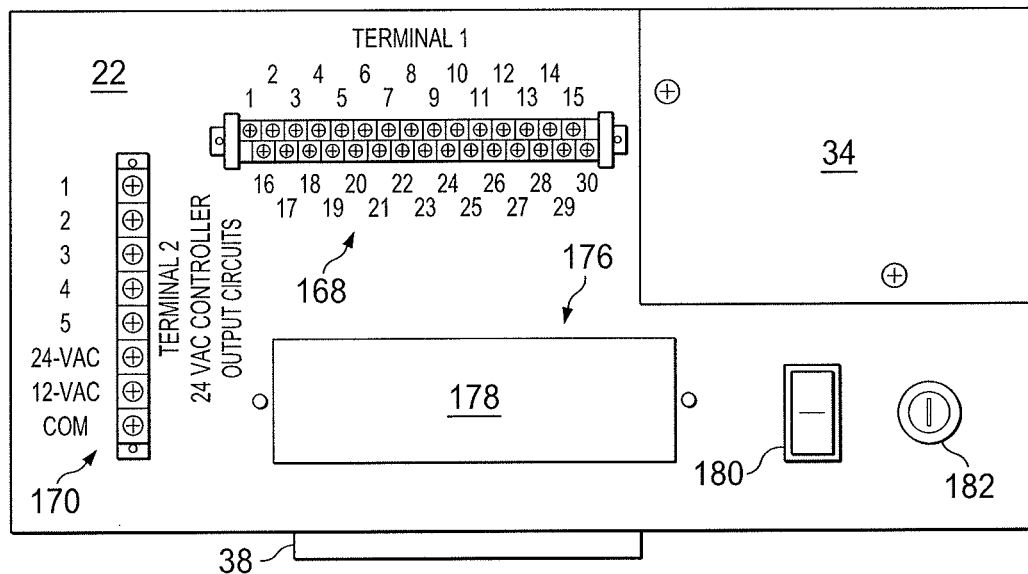
FIG. 16 shows the front face of the Control Panel used by the service panel of this invention.

FIGS. 15A and 15B illustrate the pin-out connections between Card-edge Connector 38 (that receives card-edge terminal 36 on PCB 22) and Communications Terminal 168 and Output Terminal 170 shown in FIG. 16. In this view Reset Switch 172 is shown on the wiring leads originating from pin 31 of the connector which is the pin for circuit #2 output. This Reset Switch 172 has an amperage rating approximately equal to the in-rush current rating for the inductive load that will be connected to the output at pin 2 on Terminal 168. The Reset Switch 172 protects both the circuitry of the PCB 24 as well as that of the device controlled by the service panel. A top view of Reset Panel 174 is shown with three (3) reset switches to illustrate that more than one of Reset Switch 172 can be incorporated into the output circuitry of the invention. The Reset Panel is attached to the Control Panel 22 at the cavity area 176 shown in FIG. 16. The pins on card-edge connector 38 of FIG. 16 indicated as Outputs terminate at respective pins on Output Terminal 170 and those not specifically indicated as Outputs connect to the pins on Communication Terminal 168 respective pins as shown in the drawing.

FIG. 16 illustrates the front face of Control Panel 45 that is a sheet metal panel comprising the power supply source, terminals for inputs and outputs, cavity area 176 and a removable plate 178 shown in FIG. 1 to receive Reset Panel 174, and the card-edge connector 38.

The card-edge terminal 36 on the PCB 24 is inserted into the card-edge connector 38. The PCB rests on standoffs, and screws hold the PCB in position. The card-edge terminal 36 is hard wired to the communications terminal 168 and Output Terminal 170. Pin-outs for terminals 168 and 170 correspond to those shown in FIG. 16.

Figure 9:
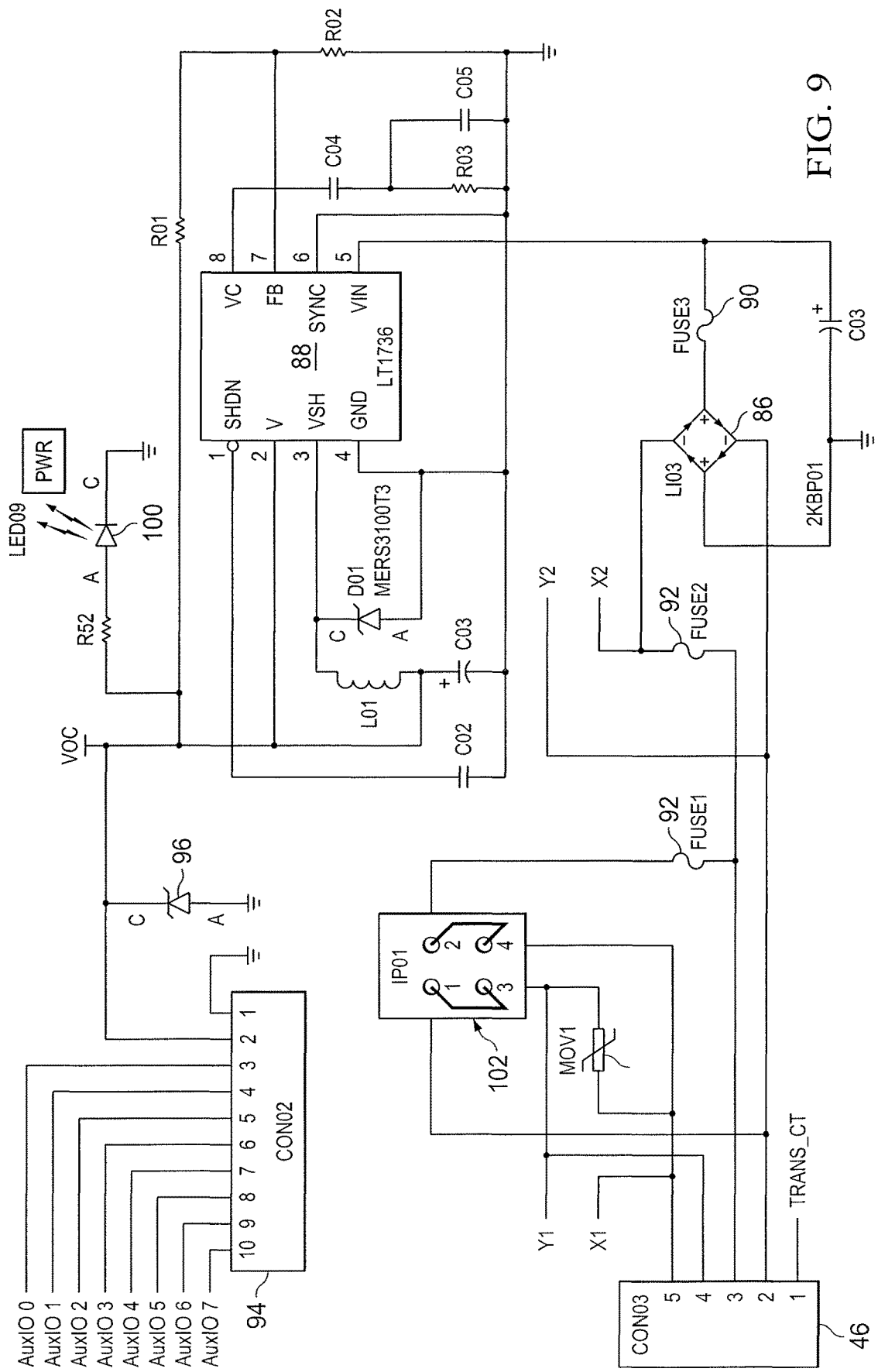
FIG. 9 is an electrical schematic of the service panel power source on the PCB 24.

Referring to FIGS. 1A and 9, the power supply source is comprised of an electrical ON/OFF Service switch 180, fuse holder with fuse 182, a junction box behind the cover 184, and electrical wiring. Line voltage wiring extends from the junction box, through the ON/OFF switch 180 and fuse 182, and then to the low voltage transformer 44 (see FIG. 1). A ground wire terminates at the base of the enclosure. Low voltage wiring leads 40 from the transformer 44 are connected to the power supply output terminal 170 from PCB 24.

The inputs to the Microprocessor 70 include the three control switches 68A, 68B, and 68C, the enabling keyed switch 62 and the panic button 76 as shown in FIGS. 12A and 12B along with an energy management system input (EMS).

Operation of the Service Panel of this invention is as follows. Through the various interfaces of the device, the microprocessor 70 establishes various operating conditions or states. The "C" programming language is with the microprocessor.

By placing a control switch 68 in the ON position and then engaging the keyed switch lock 62, signaling is transmitted to the microprocessor 70 that then operates the corresponding output relay, turning ON the connected utility or equipment. Placing the control switch 68 in the OFF position turns the connected utility or equipment OFF. Pressing the Panic button 76 signals the microprocessor 70 to enter the PANIC mode, turning all connected devices OFF.

Along with inputs through the before mentioned opto-isolators, the Door Panel Switches when closed change the inputs from HI to LOW, thus changing the state of the various programs of the microprocessor.

| Abb. | Actual Input/Function |
|---|---|
| K | Key Switch |
| E | ems Signal |
| P | Panic |
| A | Alarm IN |
| P2 | Isolated Panic |
| C_1 | Circuit # 1 |
| S_1 | Cir 1 Input |
| C_2 | Circuit # 2 |
| S_2 | Cir 2 Input |
| C_3 | Circuit # 3 |
| S_3 | Cir 3 Input |
| C_4 | Circuit # 4 |
| S_4 | Cir 4 Input |

Abbreviations for Inputs are Set Out in the Following Table

As outlined in the above table, the programming functions and output circuits are based on these inputs as well settings for the configuration positions. To illustrate the conditions of operation according to these tables certain symbols are used. !X indicates that the input is Low. ! "Variable" or ! "Function" indicates the Function is OFF. "+" refers to "and".

The following Tables 1-9 aid the understanding of the invention. More specifically, Table 1 describes the primary function settings. Included are T0, T2, T3 and T4, all timing functions. These timing configurations are used to establish specific operating sequences. T0 can be used when no "EMS" signal is present. If T0 is set to >0 then all services actively on will turn OFF if the scheduling for OFF with "EMS" is true. T2 establishes timing whereby active circuits will turn OFF at the end of T2 timing if the scheduling for OFF with T2 is true. T3 and T4 initiate time delays. Other functions in the table are self-explanatory.

TABLE 1

Configuration Positions
Primary Settings

| | Function | Variable | |
|---|---|---|---|
| 2 | Reset Default | RS | 0 = No<br>1 = Yes<br>Must be @ 1 before master Reset to Defaults, always goes to 0 after programming complete |
| 3 | EMS Input | EMS | 0 = No EMS<br>1 = EMS active ON<br>2 = EMS active OFF<br>3 = No EMS but First Key Timing |
| 4 | Key Reset | KR | 0 = RESET Button resets from Panic, Alarm, etc.<br>1 = RESET Button OR Keying |
| 5 | Alarm Output | AM | 0 = Standard<br>1 = Momentary Panic (P1) |
| 6 | T 0 First Key Timing | FK | 0 = No Timing<br>4 = 4 Hr (after first keying all circuits go OFF)<br>6 = 6 Hr<br>8 = 8 Hr<br>10 = 10 Hr<br>12 = 12 Hr<br>16 = 16 Hr<br>20 = 20 Hr |
| 7 | T 2 Circuit Timing | T2 | 0 = No Timing<br>15 = 15 min (after first keying circuits W/T2 = go OFF)<br>30 = 30 min    (Circuits where T2x = 1)<br>45 = 45 min<br>60 = 60 min<br>90 = 90 min |

TABLE 1-continued

Configuration Positions
Primary Settings

| | Function | Variable | | |
|---|---|---|---|---|
| | | | 2 = 120 min | |
| | | | 3 = 180 min | |
| | | | 4 = 240 min | |
| 8 | T3 Panic Notify Delay | T3 | 0 = No Delay | |
| | | | 1 = 1 min | |
| | | | 2 = 2 min | |
| | | | 3 = 3 min | |
| | | | 4 = 4 min | |
| | | | 5 = 5 min | |
| 9 | T4 J_1 to Panic Delay | T4 | 0 = No Effect | |
| | | | 1 = 1 min | |
| | | | 2 = 2 min | |
| | | | 3 = 3 min | |
| | | | 4 = 4 min | |
| | | | 5 = 5 min | |
| | | | 10 = 10 min | |
| 32 | J1 effects LA output | LAJ | 0 = no | |
| | | | 1 = Yes | |

TABLE 2

Configuration Positions
Circuit Function Criteria

| Circuit | Position | Info | Variable | Notes |
|---|---|---|---|---|
| Cir #1 | 10 | J1 Effect on Cell | DJ1a | 0 = none / 1 = yes |
| Cir # 1 | 11 | T2 Effects Operation OFF | T2a | 0 = no / 1 = yes |
| Cir #2 | 12 | J1 Effect on Cell | DJ1b | 0 = none / 1 = yes |
| Cir # 2 | 13 | T2 Effects Operation OFF | T2b | 0 = no / 1 = yes |
| Cir #3 | 14 | Is Cell Standard or Fan | DF1 | 0 = Standard / 1 = Fan |
| Cir #3 | 15 | D = 0 EMS Influence if Fan | DF2 | 0 = no / 1 = yes |
| Cir #3 | 16 | J1 Effect on Cell | DJ1c | 0 = none / 1 = yes |
| Cir # 3 | 17 | T2 Effects Operation OFF | T2c | 0 = no / 1 = yes |
| Cir #4 | 18 | Is Cell Remote or Switched | DR4 | 0 = Remote / 1 = Switch |
| Cir #4 | 19 | Is Cell Standard or Fan | DF4 | 0 = Standard / 1 = Fan |
| Cir #4 | 20 | EMS Influence if Fan | DF5 | 0 = no / 1 = yes |
| Cir #4 | 21 | J1 Effect on Cell | DJ1d | 0 = none / 1 = yes |
| Cir # 4 | 22 | T2 Effects Operation OFF | T2d | 0 = no / 1 = yes |
| Cir #5 | 23 | Is Cell Not Used, or Remote or Cir 3a | DR6 | 0 = Nothing / 1 = Remote / 2 = Switch Cir 3a |
| Cir #5 | 24 | If remote Standard or Fan | DF6 | 0 = Standard / 1 = Fan |
| Cir #5 | 25 | EMS Influence | DF7 | 0 = no / 1 = yes |
| Cir #5 | 26 | J1 Effect on Cell | DJ1e | 0 = none / 1 = yes |
| Cir #5 | 27 | T2 Effects Operation OFF | T2e | 0 = none / 1 = yes |
| Cir # 5 | 28 | if Fan If only active on Panic | DFP | 0 = no / 1 = yes |

TABLE 3

Programming Options; some based on Position Configurations

| | | |
|---|---|---|
| EMS Function | | If EM = 3 |
| | | If FK = 0 |
| | Turn ON | !E |
| | Turn OFF | E |
| | | Else |
| | Turn ON | FK (turns ON) |
| | Turn OFF | !KF (turns OFF) |
| | | Else |
| | | If EM = 2 |
| | Turn ON | E |
| | Turn OFF | !E |
| | | else |
| | Turn ON | !E |
| | Turn OFF | E |
| KF | Turn ON | EMS + !K + !KF |
| | Turn OFF | KF + !EMS |
| KFF | Turn ON | EMS + !K + !KFF |
| | Turn OFF | (KFF + !EMS) or T2 OFF |

TABLE 3-continued

| Programming Options; some based on Position Configurations | | |
|---|---|---|
| P_1 | | If KR = 0 |
| Panic | Turn ON | (!P+ !P_1) or P_2 or J_3 |
| | Turn OFF | P +!P_2+!J_3+ !R |
| | | Else |
| | Turn ON | (!P+ !P_1) or P_2 or J_3 |
| | Turn OFF | (P + !P_2+!J_3+ !R) or (P +!P_2+!J_3+ !K) |
| P_2 | | If T4=0 |
| ISO_Panic | Turn ON | If KR = 0 |
| | Turn OFF | !P2 + !P_2 |
| | | P2 + !R |
| | | Else |
| | Turn ON | !P2 + !P_2 |
| | Turn OFF | P2 + !R or P2 + !K |
| | | Else |
| | | If KR = 0 |
| | Turn ON | !P2 + !P_2 or ( J_1 + !T4) |
| | Turn OFF | P2 + !R |
| | | Else |
| | Turn ON | !P2 + !P_2 or ( J_1 + !T4) |
| | Turn OFF | P2 + !R or P2 + !K |
| J_3 | Turn ON | If KR = 0 |
| | Turn OFF | !J3 + !J_3 |
| | | J3 + !R |
| | | Else |
| | | !J3 + !J_3 |
| | | (J3 + !R) or (J3 + !K) |
| J_1 | Turn ON | !J1+ !J_1   (Turns ON T4 if T4 > 0) |
| | Turn OFF | J1 + !K   (Stops T4 and reset to 0 if T4 > 0) |
| J_2 | Turn ON | !J2 + !J_2 |
| | Turn OFF | J2 + !K |

TABLE 4

| Programming Options; | | |
|---|---|---|
| A_1 | | If KR = 0 |
| Function | Turn ON | !A + !A_1 |
| | Turn OFF | A + !R |
| | | Else |
| | Turn ON | !A + !A_1 |
| | Turn OFF | A + !R or A + !K |
| LA | | If LAJ = 0 |
| Output | Turn ON | A_1 or !P or P_2 or J_3 or !EMS |
| | Turn OFF | !A_1 + P +! P_2 + !J_3 + EMS |
| | | else |
| | Turn ON | A_1 or !P or P_2 or J_1 or J_3 or !EMS |
| | Turn OFF | !A_1 + P +! P_2 + !J_1 + !J_3 + EMS |
| Panic_Out | | If T3 = 0 |
| Output | Turn ON | P_1 |
| | Turn OFF | !P_1 |
| | | else |
| | Turn ON | (P_1+!T3) |
| | Turn OFF | !P_1 |
| Alarm_Out | | If AM = 0 |
| Output | Turn ON | A_1 |
| | Turn OFF | !A_1 |
| | | Else (Momentary pressing of Panic Button activates circuit) |
| | Turn ON | !P |
| | Turn OFF | P |

NOTE:
!T3 & !T4 INDICATES END OF TIMING CYCLE

TABLE 5

PRGRAMMING OPTIONS CIR # 1
!K = KEYSWITCH ACTIVE or LOW
!P__1 = PANIC is OFF  P__1 = PANIC is ON

```
C_1         If T2a = 0
                If DJ1a=1: (if J1 affects)
    turn ON:        EMS+!K+!P__1+!A__1+!S1+!J__1
    turn OFF        !EMS or P__1or S1 or A__1 or J__1
                else
    turn ON:        EMS+!K+!P__1+!A__1+!S1
    turn OFF        !EMS or P__1or S1 or A__1
                else (if timer #2 effects)
                If DJ1a=1: (if J1 affects)
```

TABLE 5-continued

PRGRAMMING OPTIONS CIR # 1
!K = KEYSWITCH ACTIVE or LOW
!P__1 = PANIC is OFF  P__1 = PANIC is ON

```
    turn ON:        EMS+!K+!P__1+!A__1+!S1+!J__1
    turn OFF        !EMS or P__1 or S1 or A__1 or J__1 or !T2
                else
    turn ON:        EMS+!K+!P__1+!A__1+!S1
    turn OFF        !EMS or P__1or S1 or A__1 or !T2
```

NOTE:
!T2 indicates end of timing cycle

TABLE 6

Programming Options CIR # 2

```
C_2         If T2a = 0
                If DJ1b=1: (if J1 affects)
    turn ON:        EMS+!K+P__1+!A__1+!S2+!J__2 +!J__1
    turn OFF        !EMS or !P__1or S2 or A__1 or J__2 or J__1
                else
    turn ON         EMS+!K+!P__1+!A__1+!S2+!J__2
    turn off        !EMS or P__1or A__1or S2 or J__2
                else (if timer #2 effects)
                If DJ1b=1: (if J1 affects)
    turn ON:        EMS+!K+!P__1+!A__1+!S2+!J__2 +!J__1
    turn OFF        !EMS or P__1or S2 or A__1 or J__2 or J__1 or !T2
                else
    turn ON         EMS+!K+!P__1+!A__1+!S2+!J__2
    turn off        !EMS or P__1or A__1or S2 or J__2 or !T2
```

TABLE 7

Programming Options CIR # 3

```
            If T2c=0
                If DF1=1 (if Fan)
                    If DF2=1 (if EMS effects OFF)
                        If DJ1c=1: (If J1 effect)
    turn ON:                (EMS+!P__1+!A__1+!S3+KF) or (EMS+P__1+!A__1)
                                or (EMS+!A__1+J__1)
    turn OFF                !EMS or (!P__1+ S3+!J__1) or A__1
                        else
    turn ON:                (EMS+!P__1+!A__1+!S3+KF) or (EMS + P__1+!A__1)
    turn OFF                !EMS or (!P__1+ S3) or A__1
                    else (DF2=0) ems effects OFF when no PANIC or J1
                        If DJ1c=1: (If J1 effect)
    turn ON:                (!P__1+!A__1+!S3+KF+EMS) or (P__1+!A__1)
                                or (!A__1+J__1)
    turn OFF                (!P__1+ S3+!J__1) or A__1 or (!EMS +!S3+ !P__1+!J__1)
                        else
    turn ON:                (!P__1+!A__1+!S3+KF+EMS) or (P__1+!A__1)
    turn OFF                (!P__1+ S3) or (!EMS +!S3+ !P__1) or A__1
                else (DF1=0)
                    If DJ1c=1: (If J1 effect)
    turn ON:            EMS+!K+!P__1+!A__1+!S3+!J__1
    turn OFF            !EMS or P__1 or A__1 or S3 or J__1
                    else
    turn ON:            EMS+!K+!P__1+!A__1+!S3
    turn OFF            !EMS or P__1 or A__1 or S3
                else (T2c <> 0 --- if timer #2 effects)
                    If DF1=1 (if Fan)
                        If DF2=1 (if EMS effects OFF)
                            If DJ1c=1: (If J1 effect)
    turn ON:                    (EMS+!P__1+!A__1+!S3+KFF) or (EMS+P__1+!A__1)
                                    or (EMS +!A__1+J__1)
    turn OFF                    !EMS or (!P__1+ S3+!J__1) or (!P__1+ !S3+!J__1+!T2) or A__1
                            else
    turn ON:                    (EMS+!P__1+!A__1+!S3+KFF) or (EMS + P__1+!A__1)
    turn OFF                    !EMS or (!P__1+ S3)or(!P__1+ !S3+!T2) or A__1
                        else (DF2=0)
                            If DJ1c=1: (If J1 effect)
```

TABLE 7-continued

Programming Options CIR # 3

| | |
|---|---|
| turn ON: | (!P_1+!A_1+!S3+KFF+EMS) or (P_1+!A_1) |
| | or (!A_1+J_1) |
| turn OFF | (!P_1+ S3+!J_1) or (!P_1+ !S3+!J_1+!T2) or A_1 or |
| | (!P_1+ !EMS+!S3+!J_1) |
| | else |
| turn ON: | (!P_1+!A_1+!S3+KFF+EMS) or (P_1+!A_1) |
| turn OFF | (!P_1+ S3) or (!P_1+ !S3+!T2) or A_1 or (!EMS+ !S3 + !P_1) |
| | else (DF1=0) |
| | If DJ1c=1: (If J1 effect) |
| turn ON: | EMS+!K+!P_1+!A_1+!S3+!J_1 |
| turn OFF | !EMS or P_1 or A_1 or S3 or J_1 or !T2 |
| | else |
| turn ON: | EMS+!K+!P_1+!A_1+!S3 |
| turn OFF | !EMS or P_1 or A_1 or S3 or !T2 |

TABLE 8

Programming Options CIR # 4

| | |
|---|---|
| | If DR4=0 (if C4 is remote) |
| | If DF4=1 (if Fan) |
| turn ON: | If T2d=0 |
| turn OFF | (EMS+!A_1+KF) or (EMS+P_1+!A_1) |
| | !EMS or (!P_1+A_1) or (P_1+A_1) |
| turn ON | else (if timer effects) |
| turn OFF | (EMS+!A_1+KFF) or (EMS+P_1+!A_1) |
| | !EMS or (!P_1+A_1) or (P_1+A_1) or T2 |
| | else (if Remote but not Fan) |
| | If DJ1d=1: (If J1 effect) |
| turn ON: | (EMS+KF+!A_1 + !P_1+!J_1) |
| turn OFF | !EMS or P_1or A_1 or J_1 |
| | else |
| turn ON: | (EMS+KF+!A_1 + !P_1) |
| turn OFF | !EMS or P_1or A_1 |
| | else (if Auxiliary) Standard Output |
| | If T2d=0 |
| | If DF4=1 (if Fan) |
| | If DF5=1 (if EMS effects OFF) |
| | If DJ1d=1: (J1 effect) |
| turn ON: | (EMS+!P_1+!A_1+!S4+KF) or (EMS+P_1+!A_1) |
| | or (EMS+!A_1+J_1) |
| turn OFF | !EMS or (!P_1+ S4+!J_1) or A_1 |
| | else |
| turn ON: | (EMS+!P_1+!A_1+!S4+KF) or (EMS + P_1+!A_1) |
| turn OFF | !EMS or (!P_1+ S4) or A_1 |
| | else ems effects OFF when no PANIC or J1 |
| | If DJ1d=1: (If J1 effect) |
| turn ON: | (!P_1+!A_1+!S4+KF+EMS) or (P_1+!A_1) |
| | or (!A_1+J_1) |
| turn OFF | (!P_1+ S4+!J_1) or A_1 or (!EMS+ !S4 + !P_1+!J_1) |
| | else |
| turn ON | (!P_1+!A_1+!S4+KF+EMS) or (P_1+!A_1) |
| turn OFF | (!P_1+ S4) or A_1 or (!EMS+ !S4 + !P_1) |
| | else (if not Fan) |
| | If DJ1d=1: (If J1 effect) |
| turn ON: | EMS+!K+!P_1+!A_1+!S4+!J_1 |
| turn OFF | !EMS or P_1 or A_1 or S4 or J_1 |
| | else |
| turn ON: | EMS+!K+!P_1+!A_1+!S4 |
| turn OFF | !EMS or P_1 or A_1 or S4 |
| | else (if timer #2 effects) |
| | If DF4=1 (if Fan) |
| | If DF5=1 (if EMS effects OFF) |
| | If DJ1d=1: (If J1 effect) |
| turn ON: | (EMS+!P_1+!A_1+!S4+ KFF) or (EMS+P_1+!A_1) |
| | or (EMS+!P_1 +!A_1+J_1) |
| turn OFF | !EMS or (!P_1+ S4+!J_1) or (!P_1+!S4+!J_1+!T2) |
| turn ON: | or A_1 |
| turn OFF | else |
| | (EMS+!P_1+!A_1+!S4+ KFF) or (EMS + P_1+!A_1) |

TABLE 8-continued

| | Programming Options CIR # 4 |
|---|---|
| turn ON: | !EMS or (!P__1+ S4) or (!P__1+ !S4+!T2) or A__1 |
| | else |
| turn OFF | If DJ1d=1: (If J1 effect) |
| | (!P__1+!A__1+!S4+ KFF +EMS) or (P__1+!A__1) |
| | or (!A__1+J__1) |
| turn ON: | (!P__1+ S4+!J__1) or (!P__1+ !S4+!J__1+!T2) or A__1 or |
| turn OFF | (!P__1+!EMS+!S4+!J__1) |
| | else |
| | (!P__1+!A__1+!S4+ KFF +EMS) or (P__1+!A__1) |
| | (!P__1+ S4) or (!P__1+ !S4+!T2) or A__1 or |
| | (!P__1+!EMS+!S4) |
| | else (if not Fan) |
| | If DJ1d=1: (If J1 effect) |
| turn ON: | EMS+!K+!P__1+!A__1+!S4+!J__1 |
| turn OFF | !EMS or P__1 or A__1 or S4 or J__1 or !T2 |
| | else |
| turn ON: | EMS+!K+!P__1+!A__1+!S4 |
| turn OFF | !EMS or P__1 or A__1 or S4 or !T2 |

TABLE 9

| | Programming Options CIR # 5 |
|---|---|
| | If DR6=0 (if nothing) |
| | Nothing happens |
| | else |
| | If DR6 = 1 (if remote) |
| | If DF6=1 (if Fan) |
| | If DFP = 0 (Operates at all times) |
| | If T2e=0 (timer for Fan only) |
| turn ON: | (EMS+!A__1+KF) or (EMS+P__1+!A__1) |
| turn OFF | !EMS or !P__1 or A__1 |
| | else (if timer effects) |
| turn ON: | (EMS+!A__1+KFF) or (EMS+P__1+!A__1) |
| turn OFF | !EMS or !P__1 or A__1 or T2 |
| | else (Fan ON only W/ Panic or J__1) |
| | If DF7 =1 (ems effects Remote Fan only if DFP = 1) |
| | If DJ1e=1: (If J1 effect) |
| turn ON | (EMS+P__1+!A__1+ KF) or (EMS+J__1+!A__1+ KF) |
| turn OFF | !EMS or (!P__1 + !J__1) or A__1 |
| | else |
| turn ON | (EMS+P__1+!A__1+ KF) |
| turn OFF | !EMS or !P__1 or A__1 |
| | else |
| | If DJ1e=1: (If J1 effect) |
| turn ON | (P__1+!A__1) or (J__1+!A__1) |
| turn OFF | (!P__1 + !J__1) or A__1 |
| | else |
| turn ON | P__1 + !A__1 |
| turn OFF | !P__1 or A__1 |
| | else (if not Fan) ems effects all Cir 5 - not fan |
| | If DJ1e=1: (If J1 effect) |
| turn ON | (EMS+KF+!P__1+!A__1+!J__1) |
| turn OFF | !EMS or P__1 or A__1 or J__1 |
| | else |
| turn ON | (EMS+KF+!P__1+!A__1) |
| turn OFF | !EMS or P__1 or A__1 |
| | else (if C__3a) (operates as a second Circuit 3 output) |
| turn ON | = C__3 |
| turn OFF | = !C__3 |

Table 2 defines the options for configuration positions affecting the circuits. Table 3 and Table 4 define the primary output and operating functions based upon the various configuration settings. Tables 5, 6, 7, 8 and 9 define the functions for the five (5) input/output circuits based upon the various configuration settings.

Figure 17A:
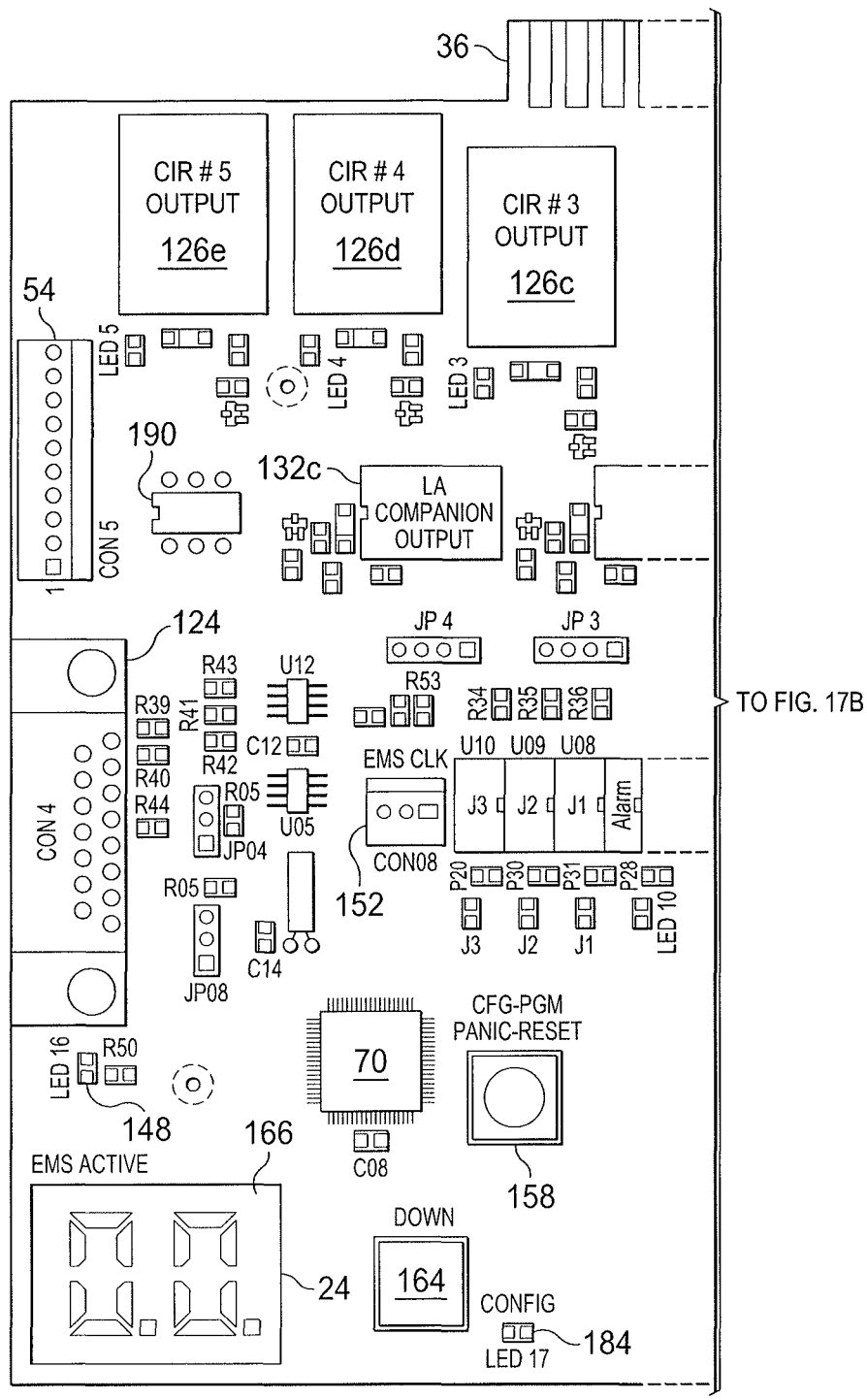
FIGS. 17A and 17B illustrate another embodiment of the full PCB used with the service panel of this invention.
Figure 17B:
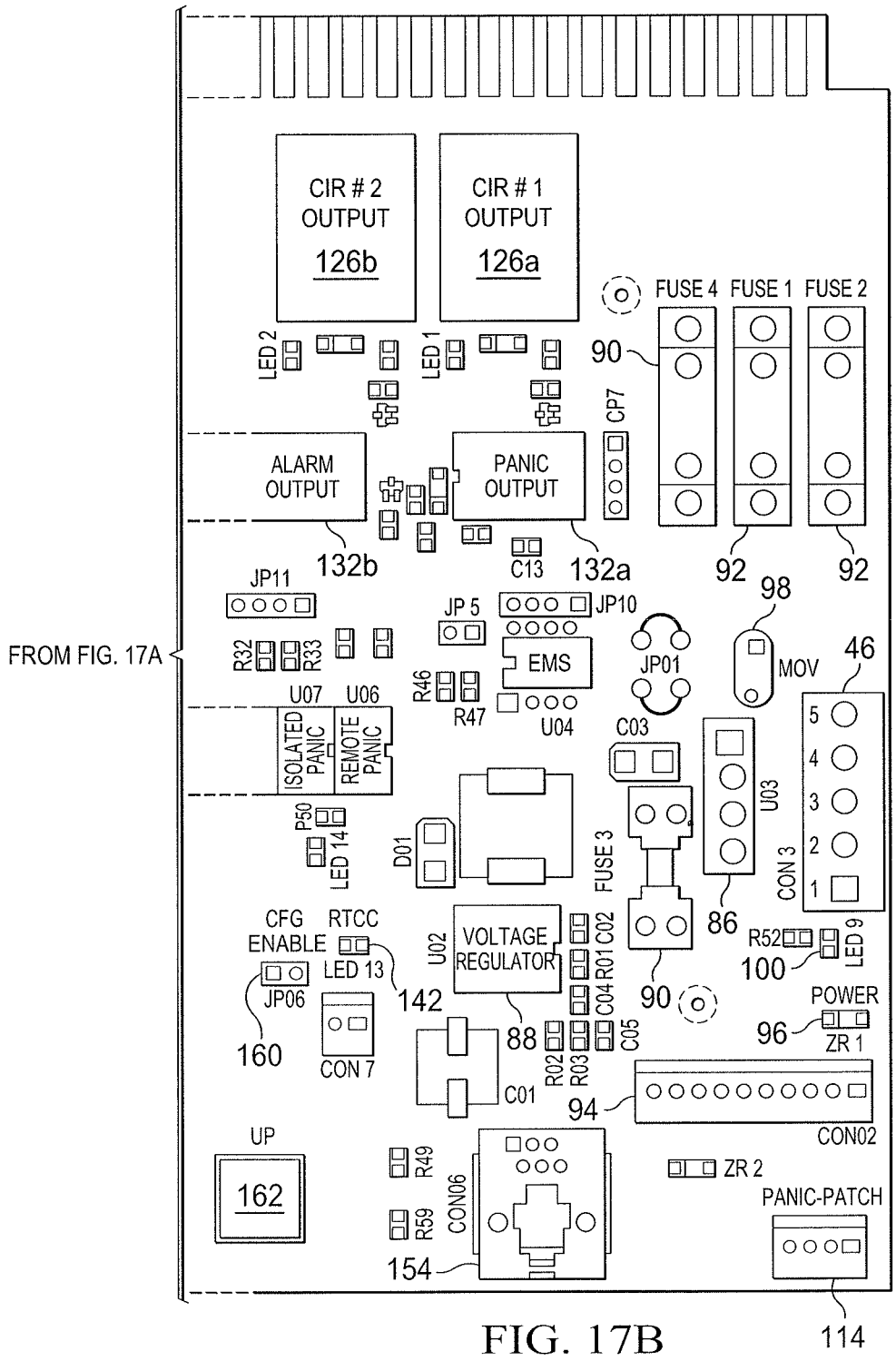

Another embodiment of the Invention is shown in FIGS. 17A and 17B (substantially identical to FIG. 3) except that it includes an additional fuse 90 for the 12-VAC output. Additionally, the additional fuse intended to protect the communications outputs is relocated within the schematic in order to be upstream or prior to the branch circuit for the dc voltage supply. As shown in FIG. 17, the additional fuse "FUSE 4" is positioned alongside "FUSE 1" and "FUSE 2". FIG. 18 is substantially the same as FIG. 9, except for the additional fuse circuit.

Figure 18A:
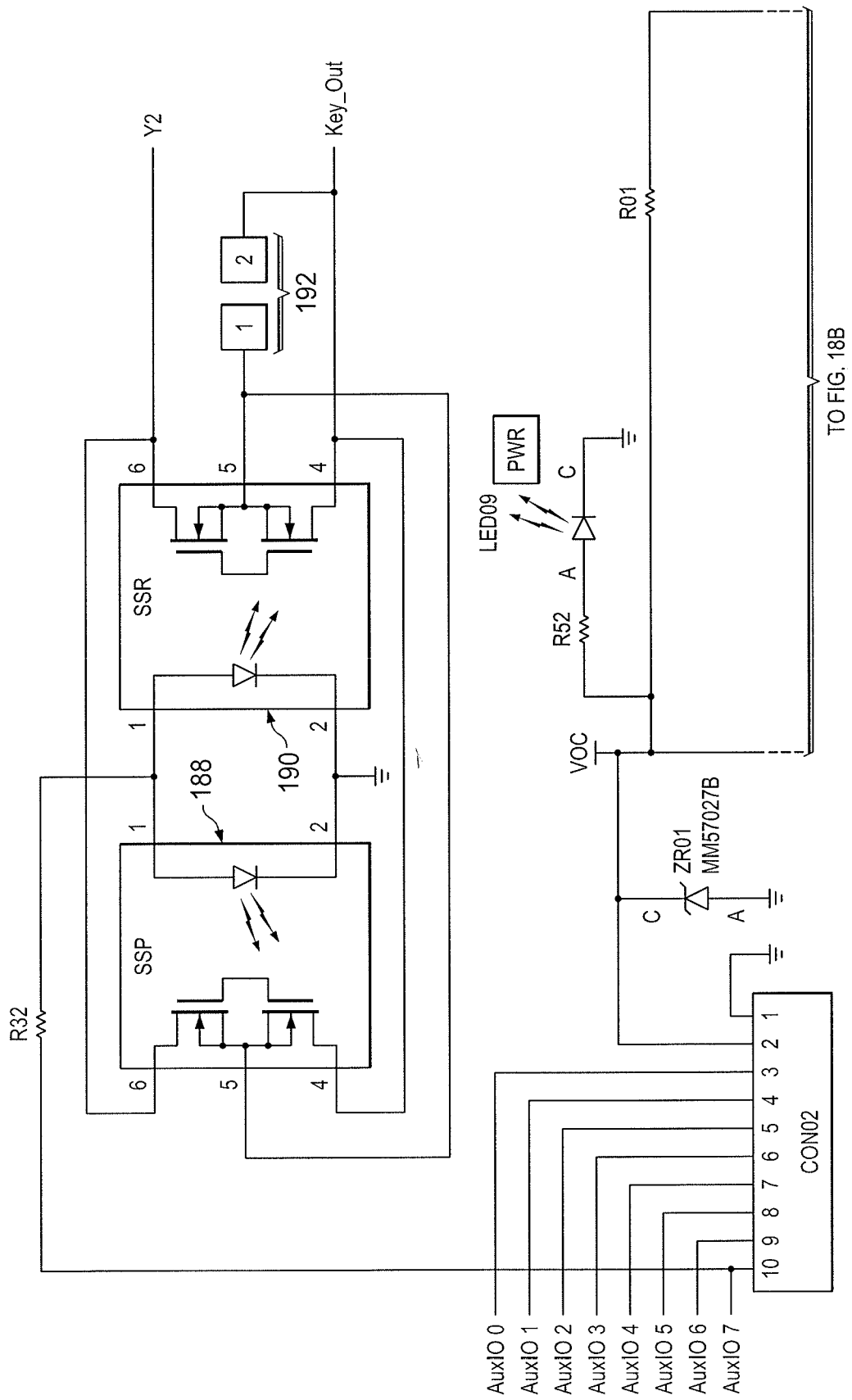
FIGS. 18A and 18B illustrate another circuit of the embodiment of FIG. 17.
Figure 18B:
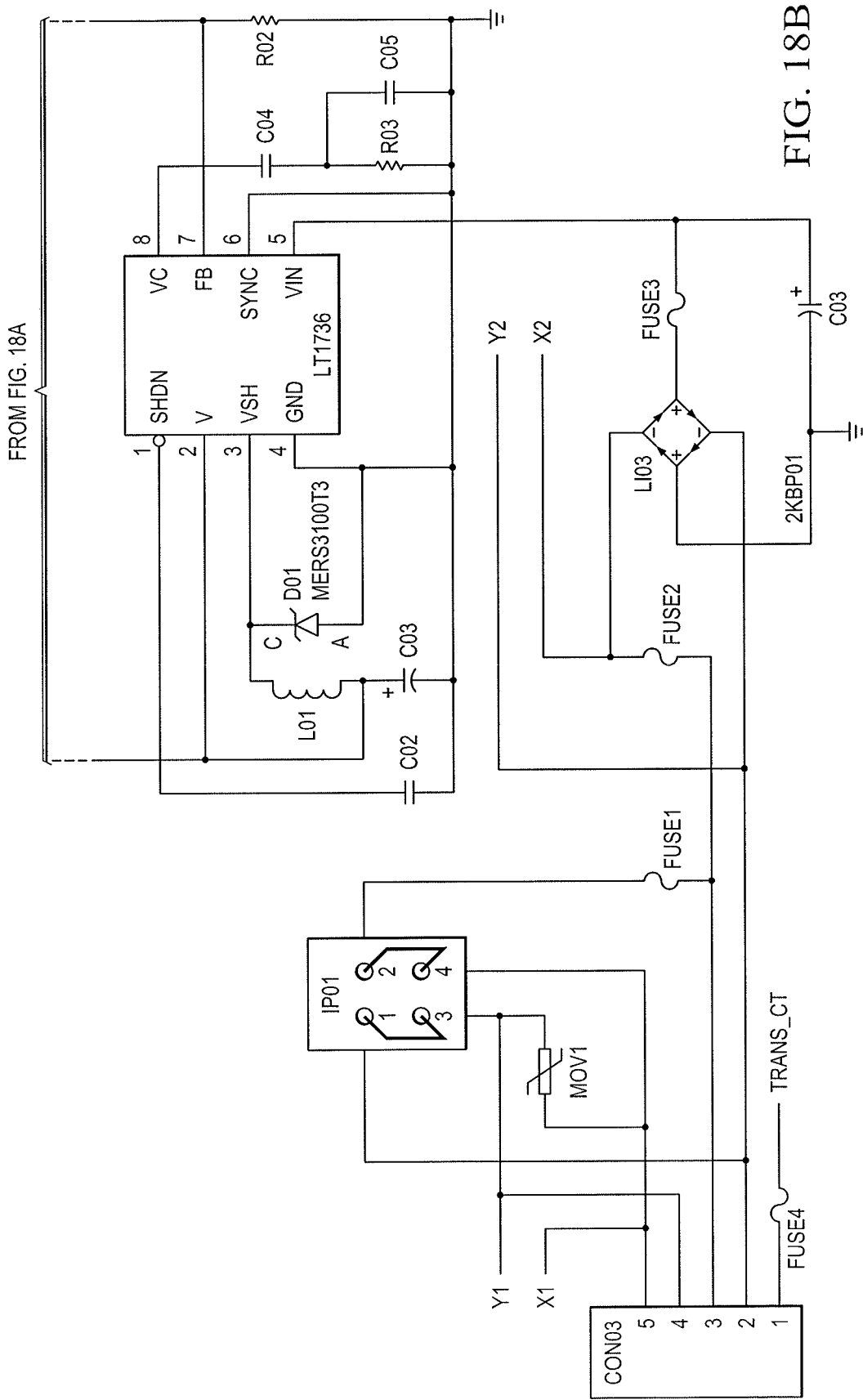

FIGS. 18A and 18B also illustrate the inclusion of a four pin relay 188 and six pin relay 190. The purpose is to populate only one of these two relays based on availability of raw product. Jumper post 192 is used to establish needed circuitry if the four pin relay 188 is used in lieu of the six pin relay 190. The purpose of the relay is to provide an output signal upon key action such that a remotely located sensing device that requires a key reset can be reset to a sensing state after being activated by the detection or sensing that indicates an emergency. Such a device for example, could be a fuel gas detector that when incorporated into the operating parameters of the invention would turn OFF the fuel gas circuit upon detection of raw gas. Resetting of this detector after the raw gas is no longer sensed might require a reset operation. The output signal from the relay would terminate at pin 1 of card-edge terminal 36, replacing the connection previously terminated at the pin.

Figure 19:
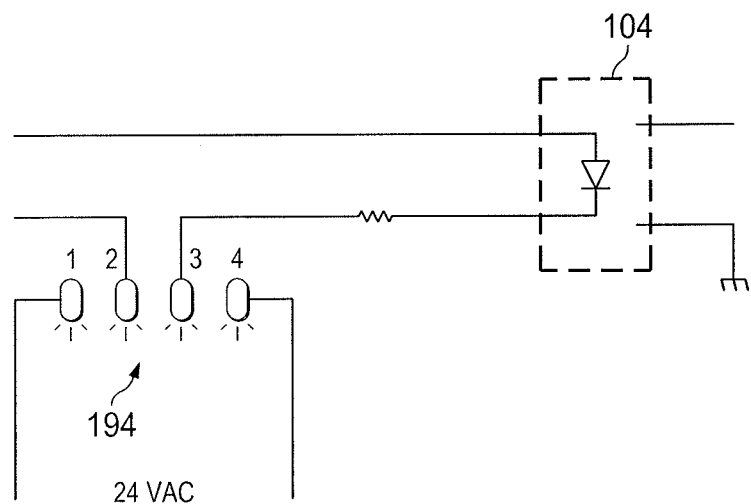
FIG. 19 shows the details of a circuit for configuring an input signal.

Now turning to FIG. 19, the addition of four pin Jumper post 194 is shown at the intersecting point between the input pins and input terminals at one of the four pin opto-isolators 104. Using jumper post 194, a 24 VAC or dry contact type of input signal can activate the associated opto-isolator 104, thus changing the state of the program to the mode contributed to the specific integration input. Placing a single jumper across the two center ping will route one of the input posts at Communication Terminal 168 to the opto-isolator 104 while the second post is directly connected to the input device. This allows for a 24 VAC input signal at the input posts to activate the opto-isolator 104. Placing two jumpers across each of the two outer pins will route one side of the 24 VAC power supply through the input posts and the second side of this supply directly to the opto-isolator, permitting a different input type, such as a dry contact input. A four pin opto-isolator 104 is illustrated. However the same type of circuitry will adequately function for the eight pin opto-isolator 106. Though not shown in the figure, these jumper posts are used at each opto-isolator where this input configuration capability may be selected. For example, in order to configure the input for an alarm input signal, the user can establish a circuit for connection of a 24-VAC remotely sourced input by placing a jumper across the center two pins. Alternately, placing a first jumper across pins 1 and 2, and then a second jumper across pins 3 and 4, the user establishes the capability to use a dry-contact relay or switch to provide a selected alarm input. Due to the introduction of the jumper into the alarm input circuitry, the need for jumper post 192, for an optional alarm input through dry-contact can be omitted.

Figure 20:
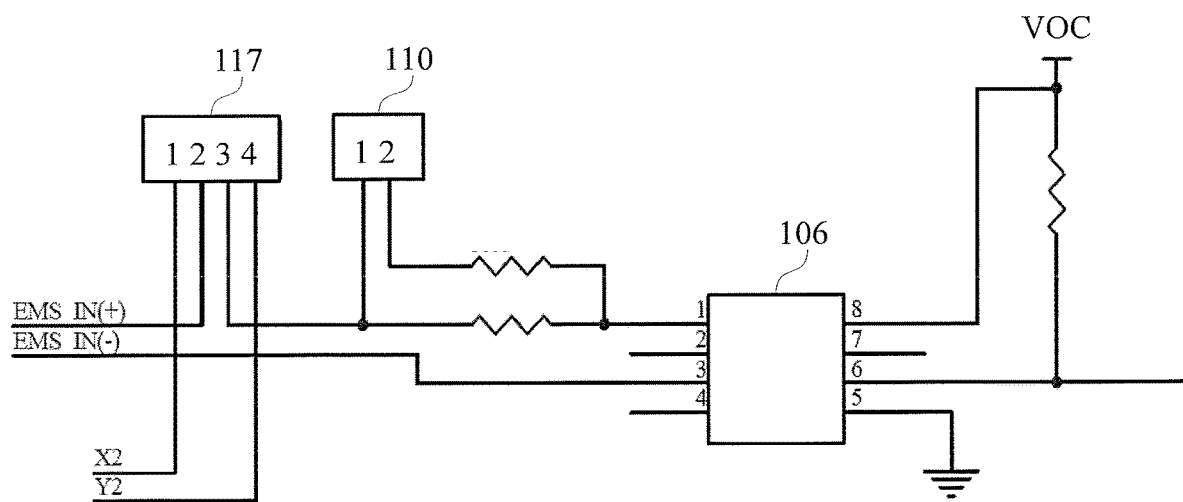
FIGS. 20 and 21 are electrical schematics showing alternative embodiments of opto-isolator circuits used to provide an interface for connecting external devices and systems to the service panel on the PCB.

FIG. 20 is an electrical schematic showing alternative embodiments of an opto-isolator circuit used to provide an interface for connecting external devices and systems to the service panel on the PCB 24. An 8-pin opto-isolator 106 may be sue to isolate an incoming EMS signal and provide the EMS signal to the EMS JP 146 (See, e.g., FIG. 10A), or directly to the microprocessor 70. A 4 post jumper 117 provides the ability to add an external or separate EMS signal provider by connecting pins 1 and 3 to pins 2 and 4, respectively. A 2 post jumper 110 provides a user-selectable voltage input, with resistors arranged to reduce an input voltage, for example, from 24V to 3V or 5V.

Figure 21:
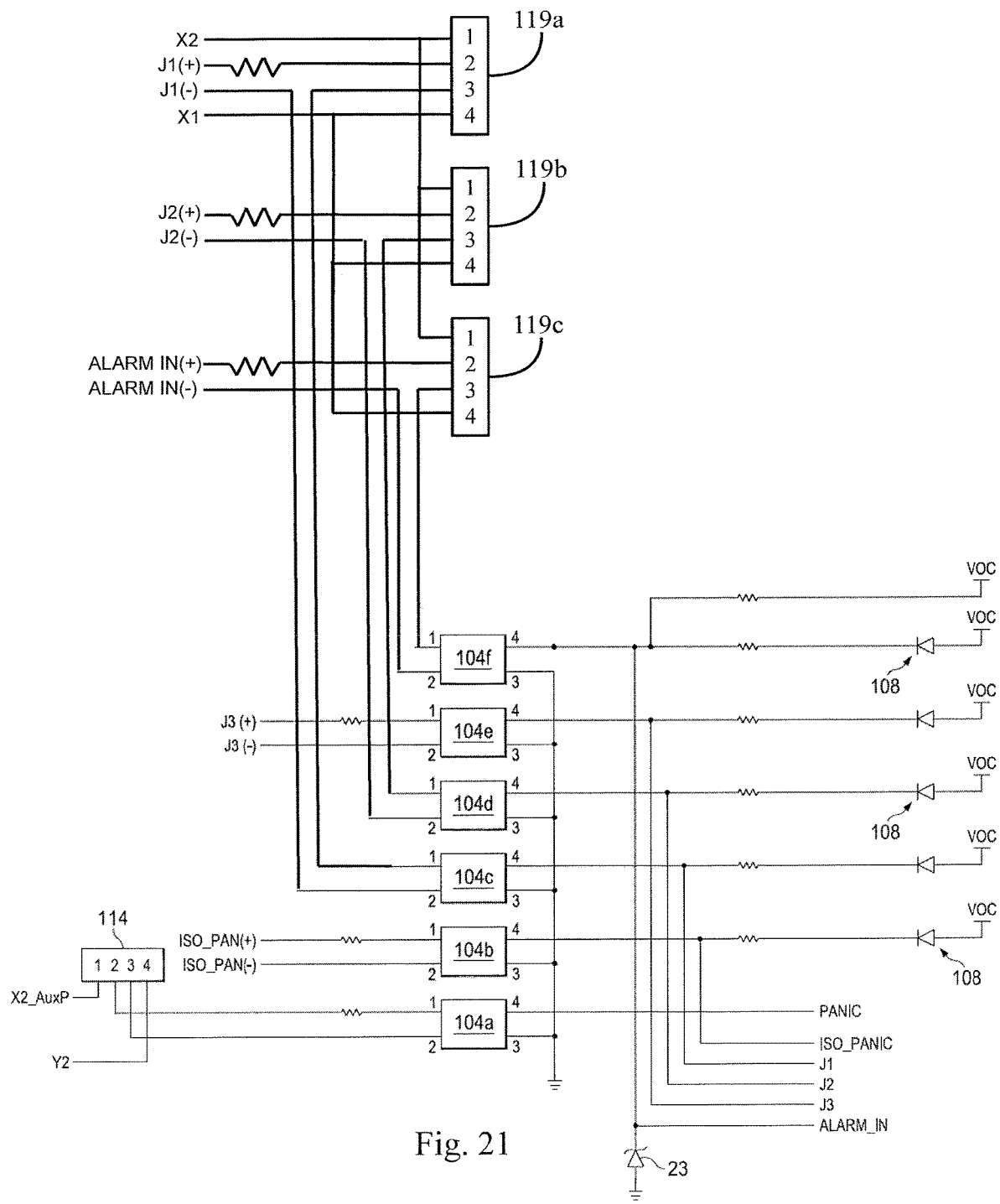

FIG. 21 is an electrical schematic showing another embodiment of an opto-isolator circuit used to provide an interface for connecting external devices and systems to the service panel on the PCB 24. The opto-isolators 104 illustrated in FIG. 10A may have a four (4) pin jumper 119 connected to the individual opto-isolators 104. The jumpers 119 provide user selectable inputs at each opto-isolator 104, permitting inputs from various other operating and monitoring devices or systems to interface with the PCB 24. The jumpers 119 allow for an optional secondary relay to be incorporated into the circuitry or plugged into the circuit. For example, a dry-contact type relay or input may be connected to a jumper 119 and disabled for testing purposed by reconfigured the associated jumper 119. Removing these jumpers and inserting a wiring harness terminating at a secondary relay permits a simple means whereby any transient voltage that may be present in field wiring can be blocked.

The Alarm input circuitry, including opto-isolator 104*f*, may have a 4 pin jumper 119*c* permitting connection of an external input through input lines X1 and X2 at card edge terminal 36 (See, e.g., FIG. 15*b*). Additionally, low voltage input opto-isolators 104*c* and 104*d* may have 4 pin jumpers 119*a* and 119*b*, respectively that are connected inline to permit user selection of inputs.

Figure 22:
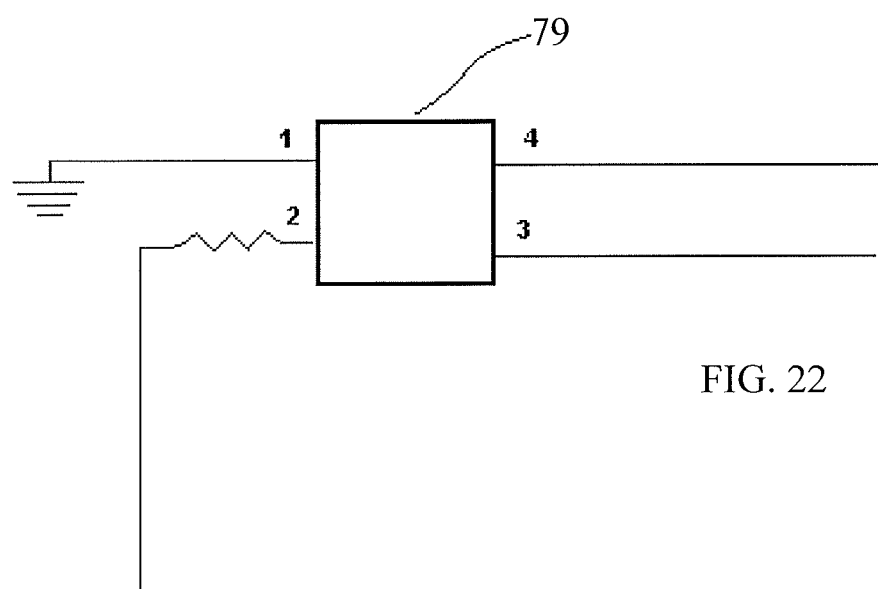
FIG. 22 shows the details of a circuit for resetting a sensor.

FIG. 22 illustrates a circuit for resetting a sensor. A four pin output key-out relay 79 in the enclosure 26 (see, e.g., FIGS. 2A-2B and 6A-6B) is used to control or reset a sensor, cut-off device, a second relay, or the like. The key-out relay 79 may be disposed on the PCB 24 (See, e.g., FIGS. 1A. 3A, 3B and 9), an add-on board or circuit, or in another configuration. The key-out relay 79 may be a dry contact type relay, or another relay or controllable switch or the like.

The key-out 79 relay is connected to the output of microprocessor 70, for example at post 2 of the key-out relay 79. Keying of keyed switch 62 (See, e.g., FIGS. 4 and 5) sends a signal to the microprocessor 70, which sends a signal to the key-out relay 79 to activate the key-out relay 79. The power supply is connected to a post of the key-out relay 79, and activation of the key-out relay 79 closes the circuit between the power supply and a key-output post at communication terminal 168 (See, e.g., FIG. 16). One or more controllable or resettable devices may be connected to the key-out output post to receive power in response to the keyed switch 62 being keyed. Thus, a re-keying or reset signal can be transmitted to a sensor, cut-off, switch, fuse, relay or the like. For example, a fuel gas sensor connected to the key-out output post may detect raw fuel gas within the environment and may transmit a shut-down signal to the controller. On keying the keyed switch 62, current from the 24 VAC power supply is routed through the key-out relay 79 key-out output post at communication terminal 168 to the fuel gas sensor to reset the sensor. In such an example, the fuel gas sensor may be powered separately, and the reset signal sent through a reset line of the fuel gas sensor. In other examples, a cut off device or resettable fuse may be reset by passing current to the key-out output post and on to the connected device to activate or reset the device.

In yet another example, an external sensor such as a seismic detector is connected to auxiliary inputs detects a seismic tremor and turns off the fuel gas circuit. The seismic detector can be connected to the microprocessor 70 through the communication terminal 168 for example at one or more jumper pins. Inputs through the communications terminal permit a selective response to the detection of a seismic tremor whereby only specific utilities controller by the invention can be selected to be turned OFF upon detection. While the example is for a seismic detector, other external sensors or devices such as carbon monoxide, temperature, water level, methane, or the like. Additionally, one or more external devices to the microprocessor 70, for example, individually, through a bus, or in another connection arrangement.

Figure 23:
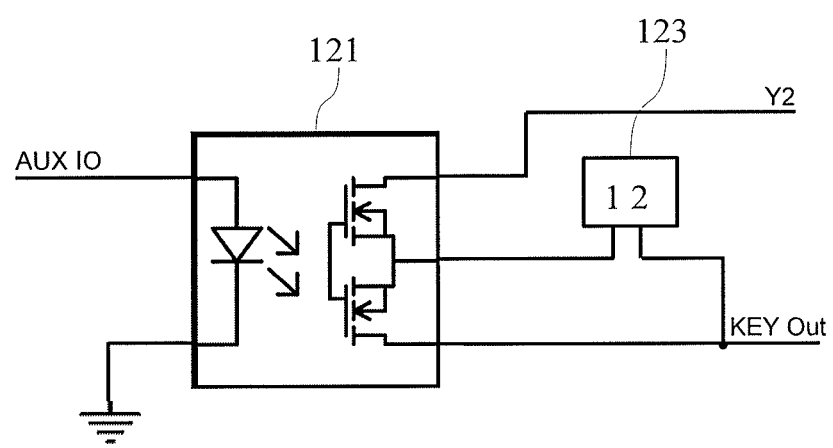
FIG. 23 illustrates a solid state relay 121 circuit for providing a key-out signal.

FIG. 23 illustrates a solid state relay 121 circuit for providing a key-out signal. A solid state relay 121 may be connected to an input such as an auxiliary input output (Aux 10) of connector 94 (See, e.g., FIG. 9). The input signal (Aux 10) activates the solid state relay 121 to pass a signal to the key-out post. A 2 post jumper 123 on the output of the solid state relay 121 may be used to manually disable the output of the solid state relay 121. The solid state relay 121 may be a dual inline package (DIP) in through holes on the PCB 24 or surface mount (SMT) package mounted on the surface of PCB 24. For example, the solid state relay may be a MOS FET relay for switching high current based on an analog signal input. A solid state relay provides a safe contact without the possibility of a spark as from a "wet" type relay. Alternatively, the solid state relay 121 may be a dry contact relay or other switch suitable for a possibly flammable environment. Thus, an outside signal (Aux 10) may be used to provide, for example, a key-out signal to reset a sensor by way of the microprocessor 70.

In summary, from the description, the many advantages of the present invention can be seen.

It is a very practical apparatus that will provide the means to control the various services typically needed in a science classroom.

It prevents unregulated use of the controlled services.

It prevents unauthorized entry to the secured compartment.

It will automatically disengage during non-scheduled periods.

It will sound an alarm in case of emergency.

Although a person of authority must activate a service, it permits persons without that authority to deactivate the service.

It will indicate an improper shutdown of controlled utility services if the "EMS" shuts down the utility controller while a switch is in the active state.

Once the selected control switch 68A, 68B or 68C energizes services, the keyed switch lock 62 returns to the OFF position, the key is removed without disrupting the active services. These services will remain active as long as the control switch remains in the ON position. Once a control switch is turned OFF, then the service returns to the non-active state. To re-energize the service, it is necessary to re-insert the key and again turn the switch 62 to the ON position. This feature prevents unregulated use of the individual services.

There are, of course, instances where a school building or facility does not have "EMS". In those cases, an optional conventional digital timer may be mounted in the service pane. This timer will activate and deactivate the service panel and utility controller at programmed time intervals. Because this timer is located within the service panel, unauthorized times of activation cannot be programmed.

Also as discussed, if the panic button 76 is pressed, the system will go to a lock out state that requires it to be reset before any services can again be activated by pressing the reset switch. Because this reset switch is located behind the locked door panel shown in FIG. 4 or 5, it becomes necessary for authorized personnel to first unlock and open the panel door and then to press the reset switch or optionally selected in Table 1; Position 3; by keying.

Thus, it is seen that the service panel with utility controller of the present invention provides a practical means of controlling the various services needed in a science classroom while providing a high level of security and safety for the students that occupy the classroom. Further, the presence of the panic button ensures that in the event of an emergency, an alarm can be sent.

To activate the individual services that are controlled by the service panel and utility controller, the "EMS" must first be in the active state. Once that is done, it is necessary that the keyed switch be turned to the ON position. At this point, control switches become active and individual services can be energized.

As was mentioned before, the means by which the utility controller regulates the time intervals for the service panel to be active or inactive is by the connection to the "EMS". Since a conventional "EMS" will turn ON and OFF such equipment as heating and cooling air units or "HVAC", it is practical for the same signal sent to activate this equipment or deactivate, the service panel. The "EMS" feature is an assurance that the service panel can only be activated during pre-specified times. Typically, the "HVAC" in school buildings are monitored and controlled by an "EMS". These "HVAC" systems are activated just prior to the commencement of the school day and deactivated at the end. The same signal used to activate the "HVAC" may be used to enable the service panel. Optionally by selecting in Table 1, Position 3, Option 1; an internal timer can be set whereby after a pre-determined time, all outputs will be turned OFF.

There may be instances where a school building does not have a fire alarm system. However, the service panel will still function properly. All controlled services will be deactivated by the pressing of the panic button and the panel will require a reset before it becomes active, only an alarm signal will not be sent.

Though the services described are the most commonly used services in school science classrooms, it should not be construed that the use of the invention be limiting in scope. For example, any gaseous or liquid service can be controlled. As discussed above, three (3) or four (4) services may be controlled in the service panel 1. As examples only, the services may include a gas cut-off assembly, and hot and cold water cut-off assemblies, one that provides cold water to the science room while the other provides hot water. However, by simply enlarging the service panel, a further cut-off assembly can be easily added. Thus, a virtually unlimited number of services can be controlled these added assemblies can control services such as oxygen or nitrogen.

For example the utility controller may control water or gas utilities, appliances, or the like. For example, the utility controller can be programmed to control the water source for a restroom in a drug-testing laboratory. Enabling the operator to turn OFF the water utilities within the restroom, the individual providing the sample would be unable to dilute the urine, thus possibly modifying the sample results. This type of control technique can also be utilized in patient rooms. When an emergency occurs with a patient in the shower, it would be beneficial for the nurse or orderly to turn OFF the water source so that aid can be administered in a dry, safe environment.

Likewise, in a residence, water flow can be detected in cases where the home owner or other occupant is away and has set the security alarm. The detection of flow by means of a flow sensor would transmit a shut-down signal to the invention, turning OFF the water. An alarm signal would be transmitted via the Panic Output Terminal that my connection to a built-in home control system would be transmitted remotely to the home owner. However, in this type of application, a time delay may be programmed into the microprocessor 70 is incorporated in order to allow ice makers and similar devises to operate momentarily without triggering a shut-down sequence.

In these types of applications, it would be beneficial to utilize a water solenoid valve that did not require constant current to remain open providing continued water flow at all times unless there is cause for having the water turned OFF. A DC voltage solenoid that will latch to the ON and then OFF positions by having the voltage signal inverted along with the circuitry to enable this signal to be both inverted to close the valve as well as momentary transmission of the signal to prevent continued current to the solenoid.

Another example of the utility controller may be within a fire station kitchen. Firemen utilize the kitchen to prepare meals during their assigned work schedule. In the event of a fire alarm, those firemen will suit up and man their vehicles in order to leave the station to fight the fire. In cases where there is meal preparation on going there is the risk of having kitchen equipment left operational with food cooking atop or within. The utility controller receives a transmitted signal from the fire notification system in order to turn OFF all connected appliances. Switches on the face panel or HMI are available to turn OFF or ON these appliances.

In the industrial field, various types of applicable uses for the utility controller are available. Where a material is transmitted by means of piping and it is practical to place an electrically operated solenoid valve in the pipe, then operating signals from the utility controller will turn these systems ON and OFF. Likewise, where machinery or other similar devices or equipment are operated electrically, the utility controller can transmit a control signal that in turn would operate said device. In such embodiments, one or more electrical relays, controllable switches, valves or solenoids may be connected to the utility controller, with the microprocessor 70 sending a control signal to the connected device to turn the device ON or OFF.

In another example, kitchen hoods and surrounding cooking areas are at a great risk of fire. The utility controller may be programmed to act as a master control unit to ensure that fans are on, temperatures do not rise beyond specified criteria, electrical devices operate when intended, dangerous gases are not present in the environment or perform other monitoring and control tasks. For example, the utility controller may control a fan speed in response to temperate, gas concentration or another detected condition.

Also, because the electronic controller is modular in nature, a series of service panels can be electronically linked so as to provide controlling service to a seemly unlimited number of individual services.

An advantage of the time delay feature of this embodiment of the invention permits delay in notification upon a panic state of the device. By addition of this feature and where the system is integrated with and monitored by a building automation system such as a fire alarm system, in the event of panic, a notification signal is delayed for a determined period to allow for reset prior to notification. An example of an instance where the feature would be of benefit is a case where the panic button was pressed in error. Having a short delay in notification will prevent false signals to be transmitted. Thus an unneeded response to a false panic signal can be avoided by permitting a brief time to reset the system prior to notification.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, means, methods and steps described in the specification. As one of ordinary skill in the art will readily appreciate from the disclosure of the present invention, processes, machines, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, means, methods, or steps.

What is claimed is:

1. A control system for controlling at least one utility, the control system comprising:
    an enclosure having an exterior and an interior;
    a limited access control accessible from the exterior for providing a temporary activate signal;
    a reset switch located in the interior of the enclosure;
    at least one utility control switch accessible from the exterior of the enclosure, the at least one utility control switch having an "ON" state and an "OFF" position; and
    a processor and data storage configured to perform a plurality of operations comprising: receiving the temporary activate signal and a selection of the at least one utility control switch;
    based on at least receiving the temporary activate signal and a selection of the at least one utility control switch, activating the at least one utility;
    receiving a selection of an emergency shut-off control;
    disabling the at least one utility and beginning a delay period;
    based on the reset switch not being selected prior to the expiration of the delay period, sending an alarm signal to a building automation system;
    receiving a selection of the reset switch;
    receiving another temporary activate signal from the limited access control and another selection of the at least one utility control switch; and
    based on at least receiving the another temporary activate signal and the another selection of the at least one utility control switch, re-activating the at least one utility.

2. The control system of claim 1, wherein the processor and data storage are programmed with a plurality of pre-programmed configuration options and the operations further comprise:
    receiving a selection of a configuration option from the plurality of pre-programmed configuration options, wherein the selected configuration has an associated state;
    receiving a modification to the associated state for the selected configuration option; and
    storing the modified state for the selected configuration option.

3. The control system of claim 2, wherein the selection of the configuration option is received through a touchscreen and the selected configuration option is displayed on the touchscreen.

4. The control system of claim 2, wherein the selected configuration option is displayed on a light-emitting-diode (LED) display in the interior of the enclosure.

5. The control system of claim 2, wherein the configuration options include an option to set the delay period.

6. The control system of claim 1, further comprising an indicator for indicating that the control system is in a configuration mode.

7. A control system for controlling at least one utility, comprising:
    an enclosure having an exterior and an interior;
    at least one utility control switch accessible from the exterior of the enclosure, the at least one utility control switch having an "ON" state and an "OFF" position;

a reset control;
an emergency shut-off control configured to cause to the control system to turn off the at least one utility;
circuitry located at least partially within the interior of the enclosure, comprising:
  at least one selection mechanism for selecting a configuration option from a plurality of pre-programmed configuration options;
a configuration selection display configured to display a currently selected configuration option from the plurality of pre-programmed configuration options; and
a processor and data storage programmed with the plurality of pre-programmed configuration options and configured to perform operations comprising:
receiving an indication that the emergency shut-off control has been selected; and
disabling the at least one utility and beginning a delay period;
based on the reset control not being selected prior to the expiration of the delay period, sending an alarm signal to a building automation system.

8. The control system of claim 7, wherein the configuration selection display is a light-emitting-diode (LED) display mounted in the interior of the enclosure.

9. The control system of claim 7, wherein the at least one selection mechanism includes an up button and a down button.

10. The control system of claim 7, further comprising a configuration mode entry selection switch.

11. The control system of claim 7, wherein the configuration selection display is a touchscreen and the at least one selection mechanism is a user interface component displayed on the touchscreen.

12. The control system of claim 7, wherein the configuration options include an option to set the delay period.

13. The control system of claim 7, further comprising a limited access control accessible from the exterior for providing a temporary activate signal.

14. The control system of claim 13, wherein selecting the reset control comprises selecting the reset control without requiring access to the interior of the enclosure.

15. A method for controlling at least one utility, the method comprising:
receiving, by a utility control system, a temporary activate signal and a selection of the at least one utility control switch;
based on at least receiving the temporary activate signal and a selection of the at least one utility control switch, activating the at least one utility;
receiving a selection of an emergency shut-off control;
disabling the at least one utility and beginning a delay period;
based on a reset control not being selected prior to the expiration of the delay period, sending an alarm signal to a building automation system;
receiving a selection of the reset control;
receiving, by the utility control system, another temporary activate signal and another selection of the at least one utility control switch; and
based on at least receiving the another temporary activate signal and the another selection of the at least one utility control switch, re-activating the at least one utility.

16. The method of claim 15, further comprising:
receiving, by the utility control system, a selection of a configuration option from a plurality of pre-programmed configuration options, wherein the selected configuration has an associated state;
receiving a modification to the associated state for the selected configuration option; and
storing the modified state for the selected configuration option.

17. The method of claim 16, wherein the selection of the configuration option is received through a touchscreen and the selected configuration option is displayed on the touchscreen.

18. The method of claim 16, further comprising displaying the selected configuration option on a light-emitting-diode (LED) display.

19. The method of claim 16, wherein the configuration options include an option to set the delay period.

20. The method of claim 16, further comprising illuminating an indicator to indicate that the control system is in a configuration mode.

* * * * *